(12) United States Patent
Fine

(10) Patent No.: US 10,084,343 B2
(45) Date of Patent: Sep. 25, 2018

(54) FREQUENCY CHANGING ENCODED RESONANT POWER TRANSFER

(71) Applicant: Empire Technology Development LLC, Wilmington, DE (US)

(72) Inventor: Kevin S. Fine, Yverdon-les-Bains (CH)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 842 days.

(21) Appl. No.: 14/304,653

(22) Filed: Jun. 13, 2014

(65) Prior Publication Data

US 2015/0364923 A1    Dec. 17, 2015

(51) Int. Cl.
    *H02J 50/12*      (2016.01)
    *H02J 17/00*      (2006.01)

(52) U.S. Cl.
    CPC .............. *H02J 50/12* (2016.02); *H02J 17/00* (2013.01); *Y10T 307/406* (2015.04)

(58) Field of Classification Search
    CPC ...................................................... H02J 50/12
    See application file for complete search history.

(56) References Cited

U.S. PATENT DOCUMENTS

| | | | |
|---|---|---|---|
| 5,005,001 A | | 4/1991 | Cordery |
| 5,764,196 A | | 6/1998 | Fujimoto et al. |
| 5,940,765 A | * | 8/1999 | Haartsen ............... H04W 88/06 455/462 |
| 7,126,450 B2 | | 10/2006 | Baarman et al. |
| 8,024,012 B2 | | 9/2011 | Clevenger et al. |
| 8,115,448 B2 | | 2/2012 | John |
| 8,169,185 B2 | | 5/2012 | Partovi et al. |
| 8,390,249 B2 | | 3/2013 | Walley et al. |
| 8,559,659 B2 | | 10/2013 | Chu et al. |

(Continued)

FOREIGN PATENT DOCUMENTS

| CN | 102082449 A | 10/2005 |
|---|---|---|
| CN | 101645618 A | 2/2010 |

(Continued)

OTHER PUBLICATIONS

"Cryptographically secure pseudorandom number generator," Accessed at http://web.archive.org/web/20140404073330/http://en.wikipedia.org/wiki/Cryptographically_secure_pseudorandom_number_generator, Accessed on Jun. 13, 2014, pp. 7.

(Continued)

*Primary Examiner* — Fritz M Fleming

(57) ABSTRACT

Systems and methods to for wireless power transfer are provided. A transmit control module generates a sequence of resonant drive frequencies for a transmit coil. The transmit control module adjusts the resonant frequency of the transmit coil according to the sequence of resonant drive frequencies. A receive control module provides payment verification to the transmit control module and receives the sequence of resonant drive frequencies from the transmit control module in return. The receive control module adjusts a resonant frequency of a receive coil according to the sequence of resonant drive frequencies to match the resonant frequency of the transmit coil. The resonant frequencies of the transmit and receive coils change at the same time to maintain coupling and efficient power transfer.

21 Claims, 9 Drawing Sheets

(56) References Cited

U.S. PATENT DOCUMENTS

| | | | |
|---|---|---|---|
| 9,384,885 B2 | 7/2016 | Karalis et al. | |
| 9,515,512 B2 | 12/2016 | Odonnell | |
| 2002/0178385 A1* | 11/2002 | Dent | G07C 9/00309 726/27 |
| 2009/0093227 A1 | 4/2009 | Egelmeers et al. | |
| 2009/0176450 A1 | 7/2009 | Chow et al. | |
| 2010/0034238 A1 | 2/2010 | Bennett | |
| 2010/0174629 A1* | 7/2010 | Taylor | G06Q 20/10 705/34 |
| 2010/0201201 A1 | 8/2010 | Mobarhan et al. | |
| 2010/0201315 A1 | 8/2010 | Oshimi et al. | |
| 2010/0219694 A1* | 9/2010 | Kurs | H01F 38/14 307/104 |
| 2010/0225270 A1 | 9/2010 | Jacobs et al. | |
| 2010/0276995 A1* | 11/2010 | Marzetta | H02J 5/005 307/104 |
| 2010/0295378 A1 | 11/2010 | Suzuki | |
| 2012/0001485 A1 | 1/2012 | Uchida | |
| 2012/0019074 A1 | 1/2012 | Frolov et al. | |
| 2012/0080957 A1 | 4/2012 | Cooper et al. | |
| 2012/0112552 A1 | 5/2012 | Baarman et al. | |
| 2012/0153739 A1 | 6/2012 | Cooper et al. | |
| 2012/0169139 A1 | 7/2012 | Kudo | |
| 2012/0212074 A1 | 8/2012 | Uchida | |
| 2012/0235508 A1 | 9/2012 | Ichikawa | |
| 2012/0290470 A1 | 11/2012 | Lee et al. | |
| 2012/0326660 A1 | 12/2012 | Lu et al. | |
| 2013/0106347 A1 | 5/2013 | Kallmyer et al. | |
| 2013/0134792 A1 | 5/2013 | Bunsen et al. | |
| 2013/0147428 A1 | 6/2013 | Kirby et al. | |
| 2013/0234527 A1 | 9/2013 | Ishihara et al. | |
| 2013/0249306 A1 | 9/2013 | Kim et al. | |
| 2013/0271069 A1 | 10/2013 | Partovi | |
| 2013/0300210 A1* | 11/2013 | Hosotani | H02J 50/12 307/104 |
| 2013/0307344 A1 | 11/2013 | Cheon et al. | |
| 2014/0021798 A1 | 1/2014 | Kesler et al. | |
| 2014/0035385 A1 | 2/2014 | Hatanaka | |
| 2014/0197694 A1 | 7/2014 | Asanuma et al. | |
| 2014/0300202 A1 | 10/2014 | Shimokawa | |
| 2014/0320369 A1 | 10/2014 | Azenui | |
| 2015/0180548 A1 | 6/2015 | Roh et al. | |
| 2015/0280482 A1 | 10/2015 | Rosenfeld | |

FOREIGN PATENT DOCUMENTS

| | | |
|---|---|---|
| CN | 101971453 A | 2/2011 |
| CN | 202475041 U | 10/2012 |
| CN | 202651905 U | 1/2013 |
| CN | 103248139 A | 8/2013 |
| CN | 203261135 U | 10/2013 |
| CN | 103843229 A | 6/2014 |
| WO | 2010047850 A1 | 4/2010 |
| WO | 2012157115 A1 | 11/2012 |
| WO | 2013102908 A1 | 7/2013 |

OTHER PUBLICATIONS

"Digi-Key," Accessed at http://www.digikey.com/product-detail/en/STL25N15F3/497-8785-6-Nd/2043712, Accessed on Jun. 13, 2014, pp. 2.

"Inductance," Accessed at http://web.archive.org/web/20140413101910/http://en.wikipedia.org/wiki/Inductance, Accessed on Jun. 13, 2014, pp. 14.

"N-channel 150 V, 0.045 0, 6 A PowerFLAT™ (6x5) STripFET™ III Power MOSFET," Accessed at http://www.st.com/st-web-ui/static/active/en/resource/technical/document/datasheet/CD00227531.pdf, pp. 1-12, (2009).

"Q factor," Accessed at http://web.archive.org/web/20140415212242/http://en.wikipedia.org/wiki/Q_factor, Accessed on Jun. 13, 2014, pp. 10.

"Varicap," Accessed at http://web.archive.org/web/20140415122319/http://en.wikipedia.org/wiki/Varicap, Accessed on Jun. 13, 2014, pp. 10.

Cannon, B.L. et al., "Magnetic resonant coupling as a potential means for wireless power transfer to multiple small receivers," IEEE Transactions on Power Electronics, vol. 24, No. 7, pp. 1819-1825 (2009).

Mohan, C. and Raj, M.K., "Wireless Power Transmission & Charging of Batteries in Multiple Electronic Accessories," International Journal of Science, Engineering and Technology Research (IJSETR), vol. 2, No. 1, Jan. 2013, pp. 8-17.

Nalty, K., "Classical Calculation for Mutual Inductance of Two Coaxial Loops in MKS Units," retrieved from http://www.kurtnalty.com/Helmholtz.pdf, Mar. 6, 2011, pp. 8.

Rattner, J., "Rattner: The Promise of Wireless Power," posted on Oct. 2, 2008, Accessed at http://blogs.intel.com/intellabs/2008/10/02/rattner_the_promise_of_wireles/, Accessed on Jul. 13, 2014, pp. 5.

Sample, A.P. et al., "Analysis, experimental results, and range adaptation of magnetically coupled resonators for wireless power transfer," IEEE Transactions on Industrial Electronics, vol. 58, No. 2, pp. 544-554 (2011).

Weingartner, M., "Wireless Power—Wireless Resonant Energy Link (WREL)," on Jul. 1, 2010, Accessed at http://web.archive.org/web/20130116070245/http://newsroom.intel.com/docs/DOC-1119, Accessed on Jul. 13, 2014, pp. 2.

"Wireless Electricity Delivered Over Distance," WiTricity, accessed at http://web.archive.org/web/20140426154458/http://www.witricity.com/index.html, archived on Apr. 26, 2014, accessed on May 16, 2017, p. 1.

"E-textiles," Wikipedia, accessed at http://web.archive.org/web/20140701073636/http://en.wikipedia.org/wiki/E-textiles, last modified on May 28, 2014, pp. 5.

"Localization using WiFi Signal Strength," accessed at http://web.archive.org/web/20100707014422/http://robotics.usc.edu/~ahoward/projects_wifi.php, archived on Jul. 7, 2010, accessed on May 16, 2017, pp. 2.

"Murata Taps Capacitive-Coupled Method for Wireless Power Transfer," Technology Focus, Murata Manufacture Co. Ltd., pp. 35-37 (Nov. 2011).

"Power-line communication," Wikipedia, accessed at https://web.archive.org/web/20140414004542/http://en.wikipedia.org/wiki/Power_line_communication, last modified on Apr. 12, 2014, pp. 7.

"SCYP Wifi Localization Tool Demo," accessed at http://www.youtube.com/watch?v=nTd-mCzIwYM, uploaded on Dec. 11, 2008, pp. 2.

"WiSpry: Dynamically Tunable RF," accessed at https://web.archive.org/web/20131208154954/http://wispry.com/index.php, archived on Dec. 8, 2013, accessed on May 16, 2017, p. 1.

"WiTricity Corp.," accessed at https://web.archive.org/web/20140512174016/www.witricity.com/pages/company.html, archived on May 12, 2014, accessed on May 16, 2017, p. 1.

"WS1050 Tunable RF Capacitor," WiSpry, Inc., pp. 1-3 (2013).

Balouchi, F., and Gohn, B., "Wireless Power: Mobile Devices, Consumer Electronics, Industrial Devices, Wireless Power Infrastructure, and Wireless Charging of Electric Vehicles: Technology Analysis, Environmental Impact, and Market Forecasts," Pike Research Report, pp. 15 (2012).

Butler, K., "Tour WiTricity's Room of Tomorrow: Wireless Charging That's Flexible," accessed at http://web.archive.org/web/20140402220152/http://blog.laptopmag.com/tour-witricitys-room-of-tomorrow-wireless-charging-thats-flexible, posted on Jan. 12, 2013, pp. 3.

Endler, M., "Intel Charges Ahead With WCT Wireless Power Standard," accessed at http://web.archive.org/web/20121127140531/http://www.informationweek.com/hardware/processors/intel-charges-ahead-with-wct-wireless-po/240006662?, posted on Sep. 4, 2012, pp. 3.

Karalis, A., et al.,"Efficient wireless non-radiative mid-range energy transfer," Annals of Physics, vol. 323, No. 1, pp. 34-48 (Apr. 27, 2007).

Kesler, M., "Highly Resonant Wireless Power Transfer: Safe, Efficient, and over Distance," WiTricity Corporation, pp. 1-32 (2013).

(56) References Cited

OTHER PUBLICATIONS

Kurs, A., et al., "Wireless Power Transfer via Strongly Coupled Magnetic Resonances," Science, vol. 317, Issue 5834, pp. 83-86 (Jul. 6, 2007).
Purcher, J., "Apple Reveals Master Details of Wireless Charging System," Patently Apple, accessed at https://web.archive.org/web/20140402154622/www.patentlyapple.com/patently-apple/2013/09/apple-reveals-master-details-of-wireless-charging-system.html, Sep. 19, 2013, pp. 7.
Tsui, A.W., et al., "Accuracy Performance Analysis between War Driving and War Walking in Metropolitan Wi-Fi Localization," IEEE Transactions on Mobile Computing, vol. 9, No. 11, pp. 1551-1562 (Nov. 2010).
Woodward, C., "WiTricity's Wireless-Power Tech Attracts $25M from Intel, Foxconn," accessed at https://web.archive.org/web/20131203220433/http://www.xconomy.com/boston/2013/10/23/witricitys-wireless-power-tech-attracts-25m-intel-foxconn/, Oct. 23, 2013, pp. 3.
Zhou, X., et al., "Wireless information and power transfer: Architecture design and rate-energy tradeoff," Global Communications Conference (GLOBECOM), pp. 3982-3987 (Dec. 3-7, 2012).

\* cited by examiner

FREQUENCY CHANGING ENCODED RESONANT POWER TRANSFER

BACKGROUND OF THE INVENTION

1. The Field of the Invention

Example embodiments disclosed herein are related to wireless power transfer, for example for charging electronic devices, such as mobile devices.

2. The Relevant Technology

Unless otherwise indicated herein, the materials described in this section are not prior art to the claims in this application and are not admitted to be prior art by inclusion in this section.

In an increasingly mobile world, it now common for a user to have one or more mobile devices such as phones or laptop computers that he or she uses regularly while away from home or the office. Such mobile use of the devices often requires use of a charged battery to power the devices. Prolonged use of the batteries depletes the batteries, which then need to be recharged in order to continue providing power to the devices.

In order to recharge the batteries, it is often necessary to find an electrical outlet or other suitable charging mechanism that is convenient to the user of a device. However, even if a convenient electrical outlet can be found, this requires that the user have a wired charger that is compatible with the device and is also compatible with the electrical outlet. In many instances, the user will not have the wired charger with him or her because wired chargers can be bulky and thus not easy to carry around. In those instances where the user does have a wired charger, there may not be a compatible electrical outlet available for use, especially if the user is traveling in a foreign country.

Wireless power transfer is a technology that can wirelessly transfer power to the device without the need for the wired charger and regardless of location. This technology can be used to charge the device batteries using a signal that is delivered to the device wirelessly.

BRIEF SUMMARY

Some embodiments disclosed herein relate to a system configured to provide wireless power transfer to one or more mobile devices. An example system includes a transmit coil that electromagnetically couples with receive coils of the mobile devices. The transmit coil generates an electromagnetic signal that induces a current in the receive coils so as to provide power to the mobile devices. The system may also include a control module that is communicatively coupled to the transmit coil and to the mobile devices. The control module generates a sequence of resonant drive frequencies that adjusts the resonant drive frequency of the transmit coil according to the generated sequence of resonant drive frequencies. The control module also provides the sequence of resonant drive frequencies to the mobile devices to allow the receive coils of the mobile devices to be driven by substantially the same resonant drive frequency as the transmit coil.

Some embodiments disclosed herein relate to system for a mobile device to receive wireless power transfer. An example system includes a receive coil of a mobile device that electromagnetically couples with a transmit coil. An electromagnetic signal generated by the transmit coil induces a current in the receive coil. The satellite system also includes a control module that is communicatively coupled to the receive coil and to a transmit module that controls the transmit coil. The control module receives from the transmit module a sequence of resonant drive frequencies for the transmit coil. The control module adjusts a resonant receive frequency of the receive coil according to the sequence of resonant drive frequencies so that the resonant receive frequency of the receive coil matches the resonant drive frequency of the transmit coil.

Some embodiments disclosed herein relate to a method to provide wireless power transfer to a device, such as a mobile electronic device, which may also be termed a mobile device. A sequence of resonant drive frequencies for a transmit coil is generated. An electromagnetic signal at a first resonant drive frequency may be transmitted to receive coils of the mobile devices. The first resonant drive frequency of the transmit coil may be adjusted to a second resonant drive frequency according to the generated sequence of resonant drive frequencies. The generated sequence of resonant drive frequencies may be provided to the mobile devices so that the resonant frequency of the receive coils may be adjusted to match the resonant drive frequency of the transmit coil at the same time the transmit coil resonant drive frequency is adjusted.

Some embodiments disclosed herein relate to a method for a mobile device to receive wireless power transfer. A sequence of resonant drive frequencies for a transmit coil may be received from a transmit module that controls the transmit coil. A first electromagnetic signal from the transmit coil transmitted at a first resonant drive frequency may be received by the receive coil of the mobile device. A first resonant receive frequency of the receive coil may be adjusted to a second resonant receive frequency according to the received sequence of resonant drive frequencies.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1A:
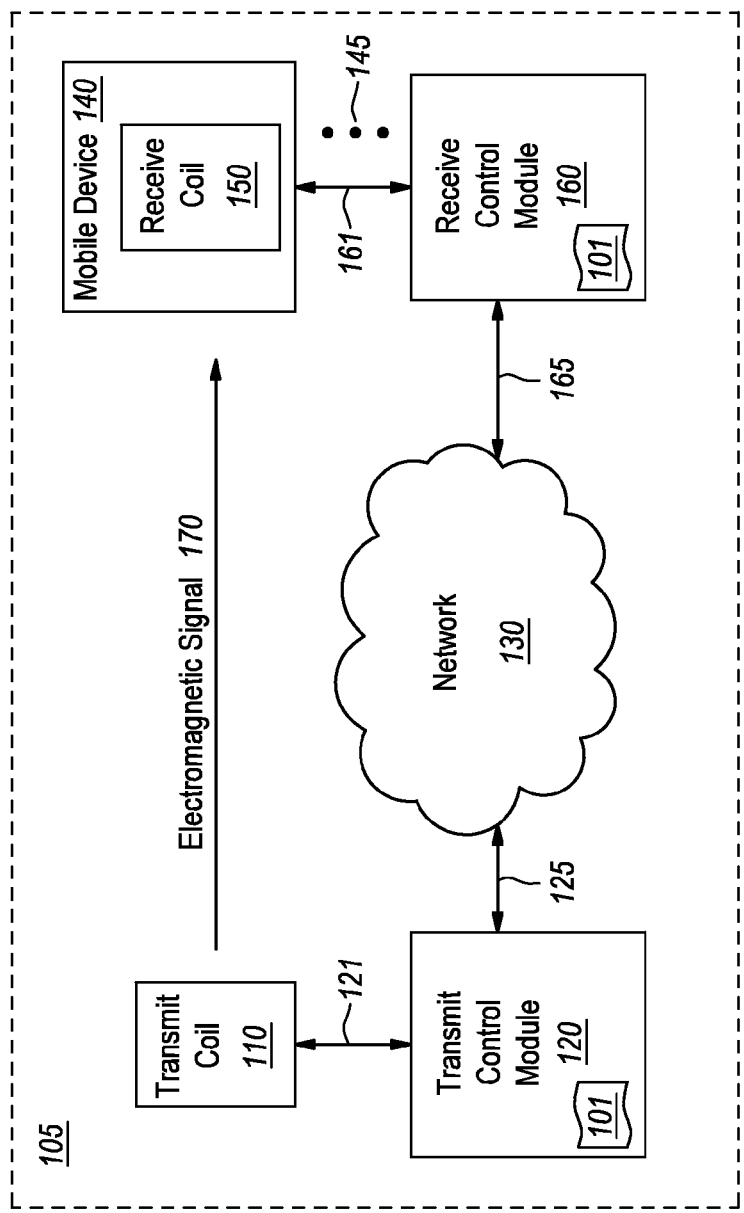
FIG. 1A is a schematic of an illustrative environment for a system to provide wireless power to a mobile device.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the figures, can be arranged, substituted, combined, separated, and designed in a wide variety of different configurations, all of which are explicitly contemplated herein.

Embodiments disclosed herein relate systems and methods for providing wireless power transfer to mobile devices that provide payment while blocking the power transfer from mobile devices that do not provide the payment. According to an embodiment, a transmit coil may be implemented in a public location. The transmit coil may electrically couple with receive coils of mobile devices that are brought into the public location. The electric coupling allows an electromagnetic signal generated by the transmit coil to induce a current in the receive coil to thereby provide power to charge the batteries of the mobile devices.

In one embodiment, a transmit control module communicatively coupled to the transmit coil generates a sequence of resonant drive frequencies for the transmit coil. The transmit control module adjusts the resonant drive frequencies of the transmit coil during different time intervals according to the sequence of resonant drive frequencies to ensure that only those receive coils that are able to follow the changes in the resonant drive frequencies are able to maintain efficient coupling and power transfer with the transmit coil.

In one embodiment, the transmit control module adjusts, or causes to be adjusted, the resonant drive frequency by adjusting a reactive element associated with the transmit coil. In one embodiment the reactive element may be an adjustable inductance or an adjustable capacitance.

In one embodiment, a receive control module of a mobile device may be communicatively coupled to the transmit control module. The receive control module may provide verification to the transmit control module that a form of payment has been provided for the wireless power transfer. In response, the transmit control module may provide the sequence of resonant drive frequencies to the receive control module.

In one embodiment, the receive control module is communicatively coupled to the receive coil and may adjust a resonant receive frequency that is equivalent to the resonant drive frequency of the transmit coil according to the sequence of resonant drive frequencies.

In one embodiment, the receive control module adjusts, or causes to be adjusted, the resonant receive frequency by adjusting a reactive element associated with the receive coil. In one embodiment the reactive element may be an adjustable inductance or an adjustable capacitance. In one embodiment, the resonant receive frequency adjusts or changes at substantially the same time that the resonant drive frequency adjusts. Accordingly, efficient electrical coupling and power transfer between the transmit and receive coils are able to be maintained during the time intervals.

FIG. 1A is a schematic illustration of an embodiment of an environment 100 for a system to provide wireless power to one or more mobile devices. As illustrated, the environment 100 may be implemented in a location 105. In one embodiment, the location 105 may be a public commercial establishment such as a restaurant, airport, store, or the like that is frequented by many different people with mobile devices.

The environment 100 may include a transmit coil 110. As will be explained in more detail to follow the transmit coil 110 is able to provide an electromagnetic signal 170 at various resonant frequencies to provide power to one or more mobile devices 140. In some embodiments, the transmit coil 110 may be implemented in the ceiling or floor of the location 105 or in furniture such as tables, counters, or chairs of the location 105 so that transmit coil may more easily couple with multiple mobile devices 140 and associated receive coils 150 that have been brought into the location 105. In such embodiments, the transmit coil 110 may be implemented as a round or square shape that provides the electromagnetic signal 170 strongly in all directions. In other embodiments, the transmit coil 110 may be implemented as a non-planar coil that may be able to control the directionality of the electromagnetic signal in one or more directions where the mobile devices 140 are more likely to be.

A transmit control module 120 may be communicatively coupled to the transmit coil 110 as indicated by line 121. Two elements may be communicatively coupled if they are able to communicate with each other via a wired, wireless, or other communication interface. As will be explained in more detail to follow, the transmit control module may generate a sequence of resonant drive frequencies 101 for the transmit coil 110. The transmit control module 120 may also adjust or cause the adjustment of the resonant drive frequency at which the transmit coil 110 transmits the electromagnetic signal 170 according to the generated sequence of resonant frequencies 101. In some embodiments, the transmit coil 110 and the transmit control module 120 may be part of a transmitter device.

The environment 100 may also include the mobile device 140. The ellipses 145 represent that there may be any number of additional mobile devices. Accordingly, the description of the mobile device 140 will also apply to the additional mobile devices 145. The mobile device 140 may be any type of mobile device such as a mobile phone, tablet, laptop computer, or other mobile computing device. Although the term "mobile" is used, the mobile device 140 may also be any computing device, even those that may not typically be considered as mobile device. In some embodiments, the mobile device may also include an external charging device that is used to charge a separate mobile device.

The mobile device 140 may be electrically coupled to the receive coil 150. In some embodiments, the receive coil 150 may be implemented as an internal component of the mobile device 140. In other embodiments, the receive coil 150 may be externally coupled to the mobile device or may be an externally coupled device such as a USB dongle. As will be explained in more detail to follow, the receive coil 150 may be electromagnetically coupled to the transmit coil 110 and receive the electromagnetic signal 170 from the transmit coil 110. The electromagnetic signal 170 may induce a current in the receive coil 150 effective to provide power to the mobile device 140. For example, the current may charge the batteries or other power source of the mobile device 140.

The environment 100 may further include a receive control module 160. The receive control module 160 is communicatively coupled to the transmit control module 120 via a network 130 as indicated by lines 125 and 165. The network 130 may be the internet, a local area network of the location 105, a wireless network, a wired network, or any other type of communication network. As will be explained in more detail to follow, the receive control module 160 may receive the sequence of resonant drive frequencies 101 from the transmit control module 120 over the network 130.

The receive control module 160 is also communicatively coupled to the mobile device 140 and the receive coil 150 as indicated by line 161. As will be described in more detail to follow, the receive control module 160 may adjust or cause the adjustment of the resonant drive frequency at which the receive coil 150 receives the electromagnetic signal 170 according to the received sequence of resonant frequencies 101 so that the receive coil 150 is able to remain electromagnetically coupled to the transmit coil 110 by operating at the same resonant frequency as the transmit coil 110. Since the receive control module 160 is communicatively coupled to the transmit control module 120, the mobile device 140, and the receive coil 150, the transmit control module 120 is also communicatively coupled to the mobile device 140 and the receive coil 150, at least indirectly.

Figure 1B:
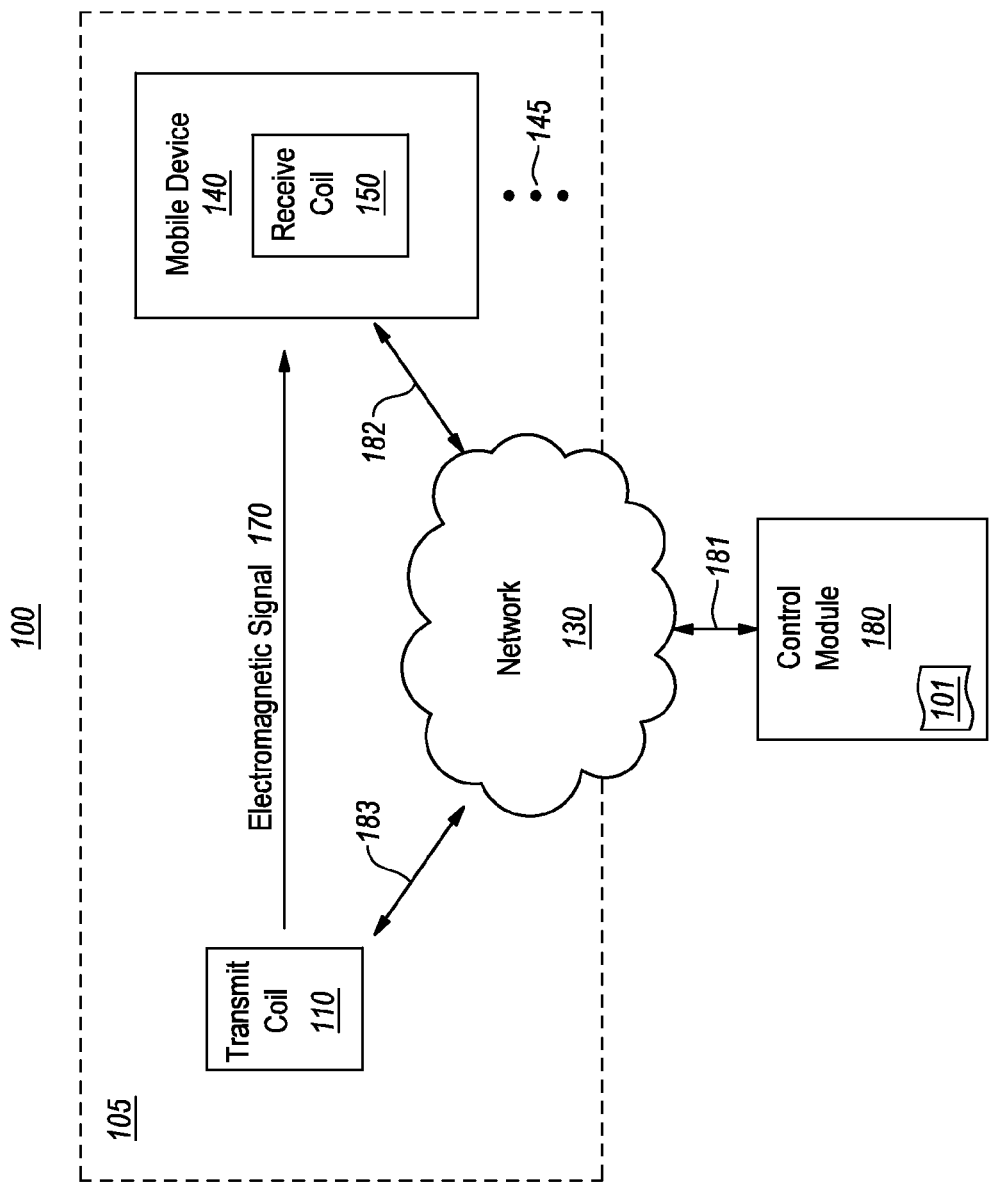
FIG. 1B is a schematic of an illustrative alternative environment for a system to provide wireless power to a mobile device.

FIG. 1B is schematic illustration of an alternate embodiment of an environment 100 for a system to provide wireless power to one or more mobile devices. As illustrated, the transmit coil 110 and the mobile device 140 and receive coil 150 may be located in the location 105 as in the environment of FIG. 1A.

However, in the environment of FIG. 1B, a control module 180 may be located separate from the location 105. The control module 180 may be communicatively coupled to the transmit coil 110 and to the mobile device 140 and receive coil 150 over the network 130 as indicated by lines 181, 182, and 183. In the embodiment, the control module may generate the sequence of resonant drive frequencies 101 for both the transmit coil 110 and the receive coil 150. Thus, the embodiments disclosed herein contemplate a remote control module for generating and providing the sequence of resonant drive frequencies 101 and for adjusting the resonant frequencies.

Although not illustrated in FIG. 1B, the environment 100 is not limited to a single remote control module 180. Accordingly, there may be one or more additional remote control modules 180, for example a remote control module associated with the transmit coil 110 and a remote control module 180 associated with the receive coil 150, that may be used to generate and provide the sequence of resonant drive frequencies 101 and for adjusting the resonant frequencies.

An example electromagnetic interaction of the transmit coil 110 and the receive coil 150 will now be explained. The transmit coil 110 is an example of a transmit device that can generate a signal, more specifically electromagnetic signal 170, that may electromagnetically couple with the receive coil 150. An alternate way to describe this coupling is the transmit coil 110 creates an oscillating magnetic field which induces a current in the receive coil 150. In one embodiment, when the transmit coil 110 includes a loop wire or one or more turns, an alternating current flowing through the transmit coil 110 can generate a magnetic field that is received by the receive coil 150. In some examples, the receive coil 150 may be magnetically coupled with the transmit coil 110. In some examples, the transmit coil generates an electromagnetic field at the receive coil, and the electromagnetic field induces a signal in the receive coil. Specifically, the transmit coil 110 is coupled with the receive coil 150 when a current flowing in the transmit coil 110 induces a current or a voltage in the receive coil 150 through electromagnetic induction. A strength of the coupling between the transmit coil 110 and the receive coil 150 may depend on a distance between them, their relative shapes, and a relationship to a common axis. Accordingly, the transmit coil 110 creates an oscillating magnetic field that transfers energy to the receive coil 150. In some examples, very little electric field is created, any interaction with human tissue or other animal tissue should be negligible, and therefore there should be no adverse health effects by the coupling of transmit coil 110 and receive coil 150.

In some embodiments, the transmit coil 110 may have an area several times the area of the receive coil 150. In some examples, the transmit coil diameter may be a multiple of the receive coil diameter, where the multiple is greater than 1 and may be at least 2. This advantageously allows the transmit coil to induce a current in multiple receive coils 150 of the mobile devices 140 and 145. In some embodiments, the transmit coil 110 may transmit between 1 W and 100 W of transmit power to the receive coil 150, more specifically the transmit coil may transmit between 60 W and 100 W of transmit power. Other transmit power sub-ranges between 1 W and 100 W may also be implemented. Further, transmit power ranges higher than 100 W may also be implemented as needed.

In one embodiment, the transmit coil 110 and the receive coil 150 may operate in a frequency range between 1 MHz and 50 MHZ, although other frequency ranges are also contemplated. Specifically, the transmit coil 110 and the receive coil 150 may transmit or receive the electromagnetic signal 170 in a range between 1 MHz and 50 MHz. As will be described in more detail to follow, the frequency range of the transmit coil 110 and the receive coil 150 may be adjusted according the sequence of resonant drive frequencies 101.

Figure 3:
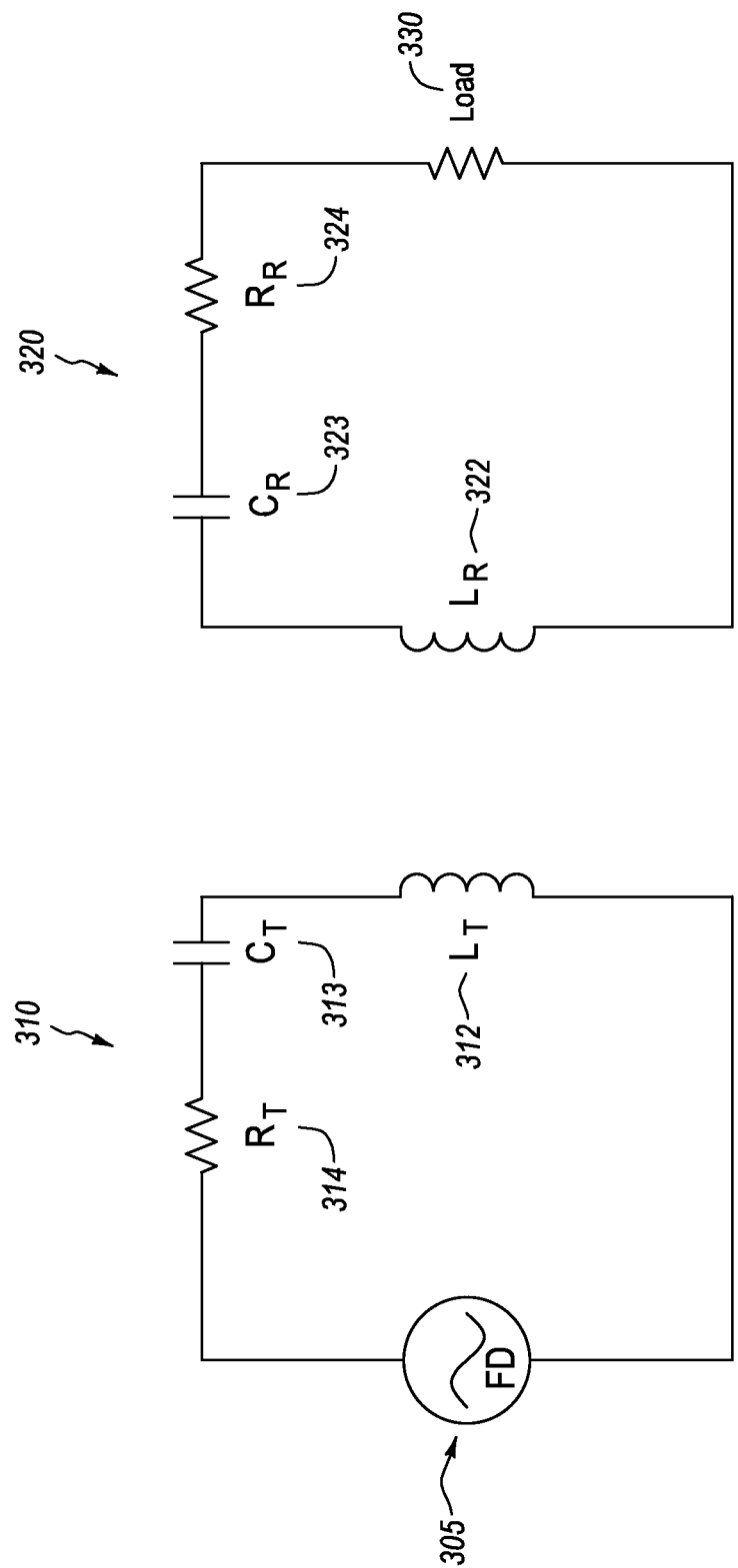
FIG. 3 is a schematic of an illustrative embodiment of an equivalent circuit of a transmit coil and a receive coil.

FIG. 3 illustrates a schematic of an equivalent circuit of a transmit coil and a receive coil, and more specifically, is a schematic of an equivalent circuit of a transmit coil 310 corresponding to transmit coil 110 and to a receive coil 320 corresponding to receive coil 150. The transmit coil 310 may be driven by a drive source 305 at a drive frequency, which may be any reasonable drive source such as those discussed further herein in relation to FIG. 3. Although not illustrated, the drive source 305 may include impendence matching circuitry as needed to ensure proper impendence matching with the transmit coil 310. The transmit coil 310 may include an inductance 312 ($L_T$), a capacitance 313 ($C_T$), and a resistance 314 ($R_T$).

The receive coil 320 may be coupled with a load 330, which may be a battery of the mobile device 140. Although not illustrated, the load 330 may include impedance matching circuitry as needed to ensure proper impedance matching with the receive coil 320. The load may include a charging circuit configured to charge a charge storage device, such as a battery, capacitor, supercapacitor, fuel cell, and the like. The charging circuit may include a rectifier, voltage adjuster, voltage limiter, and any other electronic circuit components appropriate to charging the charge storage device. The receive coil 320 may include an inductance 322 ($L_R$), a capacitance 323 ($C_R$), and a resistance 324 ($R_R$). The resistance 324 may not be a separate element but may instead be the formed from the resistance of the other circuit elements and wires themselves.

The drive source 305 pumps up the transmit coil 310 to high levels of stored energy. In some examples, the transmit coil 310 transmits at MHz frequencies, such as between 1 MHz and 50 MHZ. by transforming energy back and forth between the magnetic field of the inductance 312 and the electric field of the capacitance 313. In some examples, the Q (quality factor) of the transmit coil may be approximately 1000, or other high Q value, and the resistance loss caused by the resistance 313 may be low. In other words, the Q value is high when the resistance is low. Accordingly, in some embodiments wire resistance may be an important parameter. The Q of the transmit coil 310 and the receive coil 320 may be set at a high level to facilitate efficient power transfer when the resonance frequencies are matched.

The receive coil receives at least a portion of the signal, such as electromagnetic signal 170, generated by the transmit coil 310. When the resonant frequency of the receive coil 320 is substantially the same as the transmit coil 310, the received signal pumps up the receive coil to an energy level similar to the transmit coil by transforming energy back and forth between the magnetic field of the inductance 322 and the electric field of the capacitance 323. The Q of the receive coil may also be high, such as a Q of approximately 1000, and the resistance loss caused by the resistance 323 may be low. The receive coil may then provide energy to the load 330.

As discussed above, in some examples the transmit coil 310 and the receive coil 320 may operate at substantially the same resonant frequencies. If the Q factor of the transmit and receive coils remains high, efficient coupling can be achieved. In order for the resonant frequencies of the transmit coil 310 and the receive coil 320 to be substantially equal, the following equation should be satisfied:

$$f_T = \frac{1}{2\pi\sqrt{L_T C_T}} = \frac{1}{2\pi\sqrt{L_R C_R}} = f_R \quad (1)$$

where $f_T$ and $f_R$ are the resonant frequencies of transmit coil 310 and receive coil 320 respectively.

The coupling coefficients $k_{TR}$ of the transmit coil 310 and the receive coil 320

$$k_{TR} = \frac{M_{TR}}{\sqrt{L_T L_R}} \quad (2)$$

where $M_{TR}$ is the mutual inductance of the transmit coil 310 and the receive coil 320.

As discussed previously in relation to FIGS. 1A and 1B, the transmit coil 110 and the transmit control module 120 may be implemented at the location 105 and the mobile device 140 and receive coil 150 may be brought into the location 105. The transmit coil 110 and the receive coil 150 may electromagnetically couple as previously described, which may result in the receive coil 150 charging the batteries or other power source of the mobile device 140.

In many instances the owner of the location 105 may have incurred significant costs to install the transmit coil 110 and transmit control module 120 and may incur costs to continually operate and maintain the transmit coil 110 and transmit control module 120. Accordingly, the owner of the location 105 may desire to charge users of the mobile devices 140 a fee for using the transmit coil 110 to charge the mobile device 140. In order for such a fee system to work, however, there may need to be a mechanism that only allows a receive coil 150 of a mobile device 140 that has provided a form of payment to fully couple with the transmit coil 110 to thereby fully receive the electromagnetic signal 170 while blocking non-paying mobile devices 140. Advantageously, the embodiments disclosed herein provide for such mechanism as will be described in further detail.

Figure 2:
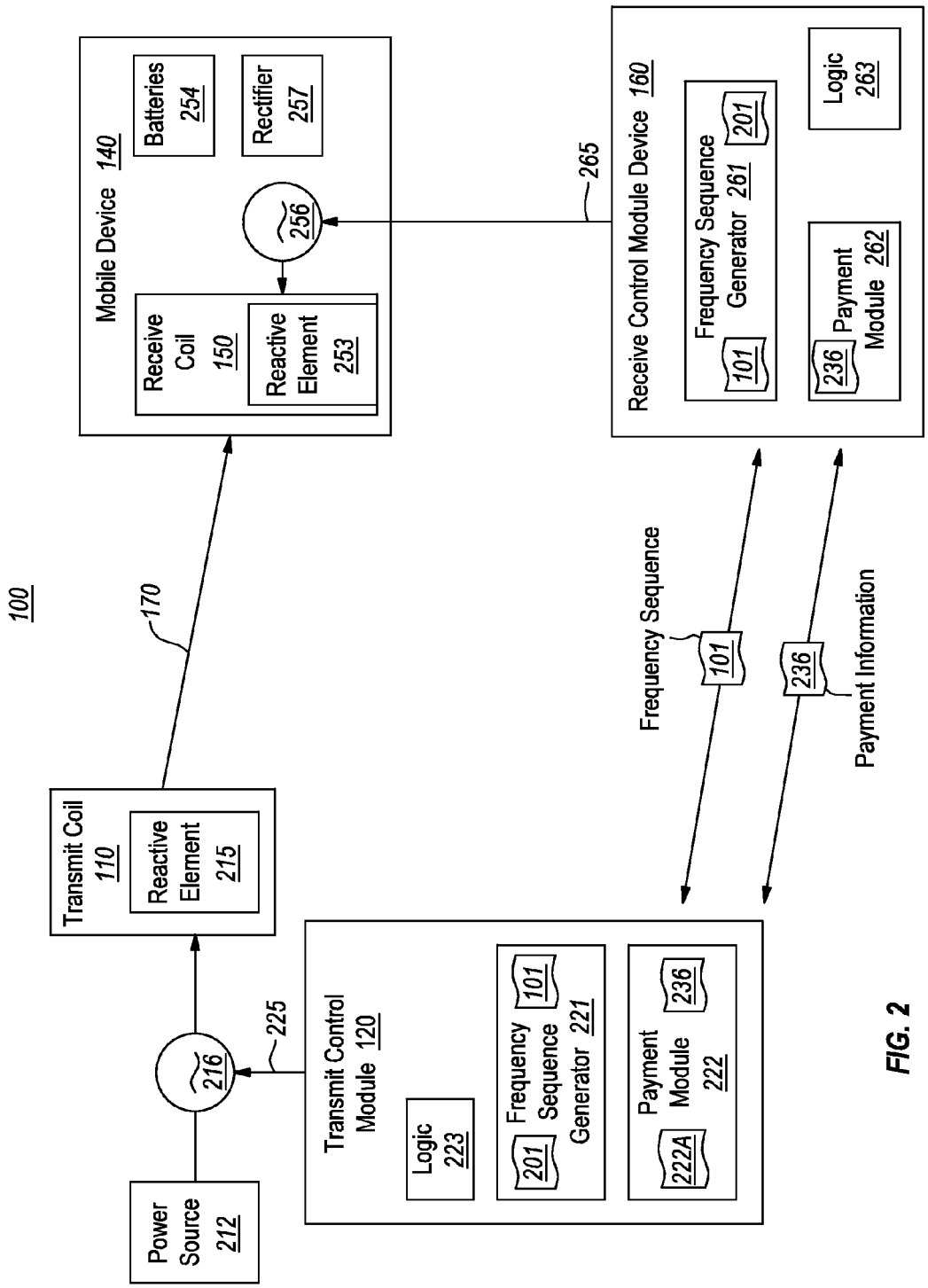
FIG. 2 is an illustration of an illustrative alternative environment for a system to provide wireless power to a mobile device.

FIG. 2 is a schematic illustration of an embodiment of an environment for a system to provide wireless power to one or more mobile devices, and more specifically is a schematic illustration of an alternative view of the environment 100 previously discussed in relation to FIGS. 1A and 1B. For clarity some elements shown in FIGS. 1A and 1B such as network 130 are not shown in FIG. 2, although such elements may be assumed to be part of the environment of FIG. 2. The environment 100 of FIG. 2 may be implemented at the location 105, although this is not required.

FIG. 2 illustrates an illustrative embodiment of the transmit control module 120. In the illustrative embodiment, the transmit control module 120 may be a computing device such as the computing device discussed in relation to FIG. 10 that is coupled to the transmit coil 110, may be part of a single transmitter device that includes the transmit coil 110, or it may be part of a software application that is resident on a computing system coupled to the transmit coil. As discussed in relation to FIGS. 1A and 1B, the transmit control module 120 may be local to the transmit coil 110 or may be remote from the transmit coil 110. Accordingly, the actual implementation of the transmit control module 120 is not limiting to the embodiments disclosed herein.

As illustrated, the transmit control module 120 may include a frequency sequence generator 221, a payment module 222, and control logic 223. The frequency sequence generator 221, the payment module 222, and the control logic 223 may be implemented as hardware modules, software modules, or any combination of hardware and software and will be discussed in more detail to follow.

As illustrated by line 225, the transmit control module 120 may be communicatively coupled to the transmit coil 110 through a frequency generator 216, which may be any reasonable frequency generator. Alternatively, the control module 120 may be directly communicatively coupled to the transmit coil 110. The frequency generator 216 may provide a resonant drive frequency in accordance with the sequence of resonant drive frequencies 101 to the transmit coil 110 to cause the transmit coil to operate at the resonant drive frequency. Although illustrated as being separate from the transmit control module 120, in some embodiments the frequency generator 216 may be part of or associated with the transmit control module 120. A power source 212, which may be any reasonable power source, provides electrical power to the frequency generator 216 and to the transmit coil 110.

A reactive element 215 may be associated with or electrically coupled to the transmit coil 110. More specifically, the reactive element 215 may correspond to the inductance 312 ($L_T$) or the capacitance 313 ($C_T$) previously discussed in relation to FIG. 3. In one embodiment, the reactive element 215 may be one of an adjustable inductance or an adjustable capacitance. As will be described in more detail to follow, the reactive element 215 may be adjusted to thereby adjust the resonant frequency or the resonance of the transmit coil 110. Although illustrated as being separate from the transmit control module 120, in some embodiments the reactive element 215 may be part of or associated with the transmit control module 120.

FIG. 2 also illustrates an illustrative embodiment of the receive control module 160. In the illustrative embodiment, the receive control module 160 may be an application running on a processor of the mobile device 140, may be a processing unit of the mobile device 140, may be a combination of an application and a processing unit, or may be a computing device such as the computing device discussed in relation to FIG. 10 that is coupled to the mobile device 140. As discussed in relation to FIGS. 1A and 1B, the receive control module 160 may be local to or part of the mobile device 140 or may be remote from the mobile device 140. Accordingly, the actual implementation of the receive control module 160 is not limiting to the embodiments disclosed herein.

As illustrated, the receive control module 160 may include a frequency sequence generator 261, a payment module 262, and control logic 263. The frequency sequence generator 261, the payment module 262, and the control logic 263 may be implemented as hardware modules, software modules, or any combination of hardware and software and will be discussed in more detail to follow.

As illustrated by line 265, the receive control module 160 may be communicatively coupled to the receive coil 150 through a frequency generator 256, which may be any reasonable frequency generator. Alternatively, the receive control module may be directly communicatively coupled to the receive coil 150. The frequency generator 256 may provide a resonant receive frequency to the receive coil 150 in accordance with the sequence of resonant drive frequencies 101 to cause the receive coil 150 to operate at a resonant receive frequency that is substantially the same as the resonant drive frequency of the transmit coil 110. Although illustrated as being separate from the receive control module 160, in some embodiments the frequency generator 256 may be part of or associated with the receive control module 160. It will be understood that the resonant receive frequency is the frequency that drives the receive coil 150 and may be identified herein as "resonant receive frequency" simply to distinguish from the resonant drive frequency of the transmit coil 110.

The receive control module 160 may also include batteries or other power source 254. The batteries 254 may be any reasonable batteries and may provide power to the various elements of the mobile device 140. In some embodiments, a rectifier 257 may be implemented to convert the current induced in the receive coil 150 into suitable form that may charge the batteries 254, such as a direct current.

A reactive element 253 may be associated with or electrically coupled to the receive coil 150. More specifically, the reactive element 253 may correspond to the inductance 322 ($L_R$) or the capacitance 323 ($C_R$) previously discussed in relation to FIG. 3. In one embodiment, the reactive element 253 may be one of an adjustable inductance or an adjustable capacitance. As will be described in more detail to follow, the reactive element 253 may be adjusted to thereby adjust the resonant receive frequency or the resonance of the receive coil 150. Although illustrated as being separate from the receive control module 160, in some embodiments the reactive element 253 may be part of or associated with the receive control module 160.

The operation of the various elements or systems of environment 100 to only allow a receive coil 150 of a mobile device 140 that has provided a form of payment to fully couple with the transmit coil 110 to thereby fully receive the electromagnetic signal 170 will now be explained. The frequency sequence generator 221 may generate the sequence of resonant drive frequencies 101. The sequence of resonant drive frequencies 101 may be a random or otherwise unpredictable sequence of frequencies within the operating range of the transmit coil 110 (and the receive coil 150). In other words, the sequence of resonant drive frequencies 101 will typically not be in any order that is easily knowable or ascertainable by a user of the device 140.

Figure 4:
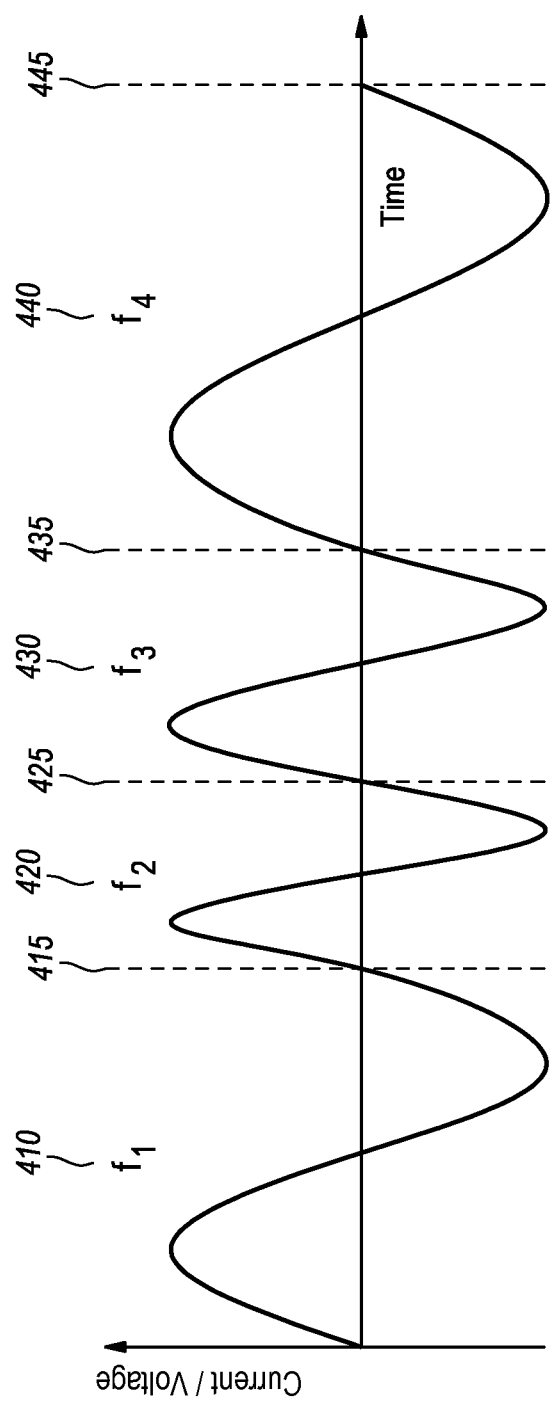
FIG. 4 illustrates an illustrative embodiment of a sequence of resonant drive frequencies.

In addition, the sequence of resonant drive frequencies 101 may vary in phase or time and may vary in the number of cycles for which each of the frequencies is implemented. For example, FIG. 4 illustrates an illustrative embodiment of the sequence of resonant drive frequencies 101. Specifically, the figure illustrates a sequence of four resonant drive frequencies 410, 420, 430, and 440 (also referred to as $f_1$, $f_2$, $f_3$, and $f_4$) plotted on a graph of current/voltage versus time or phase. As illustrated, frequency 410 has a first phase, frequency 420 has a second phase, frequency 430 has a third phase, and frequency 440 has a fourth phase. It will be noted that the various phases of the frequencies are different.

Although FIG. 4 only shows one cycle for each of the frequencies 410, 420, 430, and 440, the embodiments disclosed herein are not limited to one cycle. In some embodiments, the number of cycles for each of the frequencies may be varied. For example, the frequency 410 may be 10 cycles in duration, the frequency 420 may be one cycle in duration, the frequency 430 may be four cycles in duration, and the frequency 440 may be 20 cycles in duration. In other embodiments, there may 100 cycles or more for each frequency.

FIG. 4 also illustrates that the frequency shifts from one frequency to another at a current or a voltage zero crossing 415, 425, 435, and 445. A current zero crossing occurs when the energy in the inductance of the transmit coil or the receive coil is at zero and all the energy in the coil is in the capacitance of the coil. Likewise, a voltage zero crossing occurs when the energy in the capacitance of the transmit coil or the receive coil is at zero and all the energy in the coil is in the inductance of the coil. Accordingly, for transmit coil or receive coils with an adjustable inductance, the frequencies may change at current zero crossings and for transmit coil or receive coils with an adjustable capacitance; the frequencies may change at voltage zero crossings.

Since the receiver coil has a large Q factor, its resonant frequency must stay closely matched the transmitter frequency to efficiently receive power. Accordingly, a mobile device 140 that cannot follow the sequence of resonant drive frequencies 101 will receive much reduced power from the transmit coil 110. In addition, if the receiver cannot follow the resonant drive frequencies 101 it will also be out of phase with the transmitted signal which will reduce received power even more. Thus, even if a device 140 is able to couple with the transmit coil by random chance, the mobile device would only remain efficiently coupled for a very short amount of cycles before getting out of phase.

The separation of the various frequencies may also be a consideration when generating the sequence of resonant drive frequencies 101. Frequency separation may be determined by the Q factor of the transmit and receive coils since $$\Delta f = \frac{f}{Q}$$

is the frequency change where the resonance of a coil produces half the power at the peak. At a frequency of several Δf from the resonance, there is almost no power transfer; at 5Q there is only about 3% power transfer. Accordingly, if the frequencies are separated by several f/Q, then a device 140 that cannot follow the sequence of resonant drive frequencies 101 will receive almost no power from the transmit coil 110 after a frequency change even if some coupling between the transmit coil and the receive coil is maintained.

For example, suppose a coil has a Q factor of 1000 and a center frequency fc=10 MHz. Using the equation $$\Delta f = \frac{5fc}{Q} = 50 \text{ kHz}$$

and assuming N=11 different frequencies the resulting sequence of resonant drive frequencies 101 would be 9.75 MHz, 9.80 MHz, 9.85 MHz, . . . , 10.20 MHz, 10.25 MHz.

Figure 5:
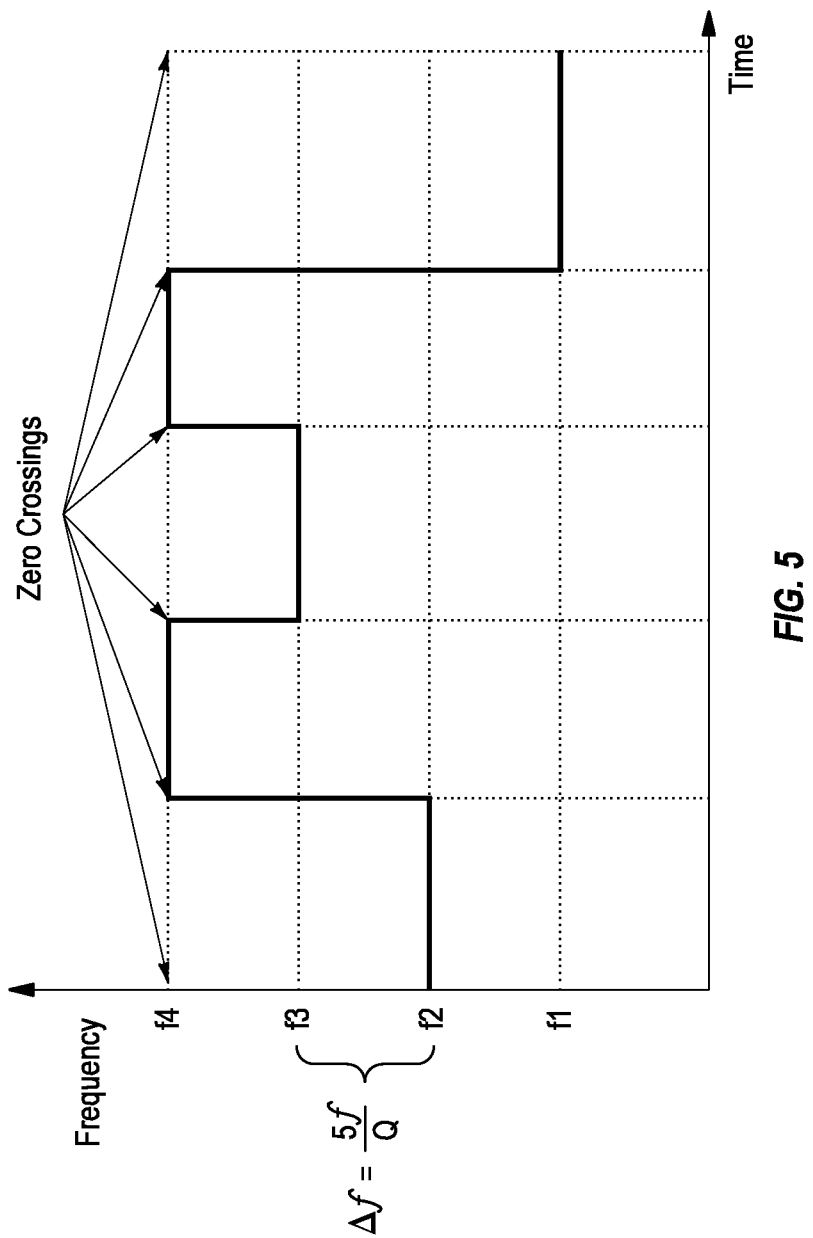
FIG. 5 illustrates a view of how a sequence of resonant drive frequencies changes with time and changes on the zero crossings.

FIG. 5 illustrates an alternative view of how the sequence of resonant drive frequencies 101 changes with time and changes on the zero crossings. It will be noted that for efficient power transfer, the resonant frequencies of transmit coil 110 and receive coil 150 should change at substantially the same time. Accordingly, the sequence of resonant drive frequencies 101 may specify the actual set of frequencies in the sequence and may also specify operational information about the set of frequencies such as how long each individual frequency will be implemented before a change occurs, the time of the change, or the number of cycles for each individual frequency.

Returning to FIG. 2, the transmit control module 120 may cause the frequency generator 216 to drive the transmit coil 110 with a resonant drive frequency. The transmit control module 120 may then cause the frequency generator to adjust or change the resonant drive frequency of the transmit coil 110 according to a first resonant drive frequency of the sequence of resonant drive frequencies 101. To ensure that the transmit coil remains at resonance, the transmit control module 120 may adjust, or cause to be adjusted, the reactive element 215 to ensure that the transmit coil operates at the first resonant drive frequency of the sequence of resonant drive frequencies 101. More specifically, in one embodiment the control logic 223 may adjust, or cause to be adjusted, the reactive element 215.

For example, since the resonant frequency of the transmit coil 110 is equal to $$\frac{1}{2\pi\sqrt{L_T C_T}}$$

as discussed previously, in one embodiment either the inductance or the capacitance of the transmit coil 110, which are examples of the reactive element 215, may be adjusted to ensure that the transmit coil operates at the first resonant drive frequency of the sequence of resonant drive frequencies 101. The configuration of the transmit coil 110 may determine which of the inductance or capacitance is adjusted. That is, some embodiments of transmit coil 110 may include an adjustable inductance, some embodiment of transmit coil 110 may include an adjustable capacitance, and some embodiments of transmit coil 110 may include both an adjustable inductance and an adjustable capacitance.

Figure 6:
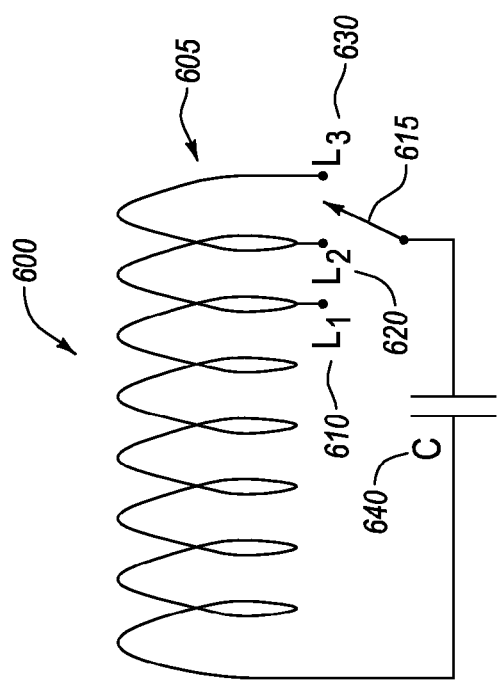
FIG. 6 illustrates a schematic of an illustrative embodiment of an adjustable inductor.

In one embodiment, the reactive element 215 may be an adjustable inductance that may adjust in accordance with the change in the resonant drive frequency. FIG. 6 illustrates a schematic of an illustrative embodiment of an adjustable inductor 600. As illustrated, the adjustable inductor 600 includes an inductor 605 that has a number of different turns and a capacitor 640. A switch 615 may switch the inductor between a number of the turns of the inductor 605 to change the inductance of the inductor 605 by changing the total number of turns. For example, when the switch 615 switches to turn 610, an inductance $L_1$ is provided by the inductor 605. Likewise, when the switch 615 switches to turn 620, an inductance $L_2$ is provided by the inductor 605. Similarly, when the switch 615 switches to turn 630, an inductance $L_3$ is provided by the inductor 605. As discussed previously, switch 615 should switch between the turns at a zero crossing of current when all the energy of the adjustable inductor 600 is stored in the capacitor 640.

In another embodiment, the reactive element 215 may be an adjustable capacitance. The adjustable capacitance may include an adjustable capacitor, such as a varactor capacitor that is controlled by voltage. The adjustable capacitance may also be a MOSFET switching network or a MEMs variable capacitor array.

Returning to FIG. 2, after the amount of time or the number of cycles specified for the first resonant drive frequency in the sequence of resonant drive frequencies 101 has occurred, the transmit control module 120 may cause the frequency generator 216 to drive the transmit coil 110 at a second resonant drive frequency of the sequence of resonant drive frequencies 101. In addition, the transmit control module 120 may adjust the reactive element 215 to ensure that the resonant frequency of the transmit coil 110 matches the second resonant drive frequency. The transmit control module 120 may continually adjust the drive frequencies and the resonance of the transmit coil in accordance with the sequence of resonant drive frequencies 101.

As discussed previously, the owner of the location 105 may desire to receive payment from a mobile device 140 that is powered by the transmit coil 110 and to block non-paying mobile devices 140. Accordingly, in the illustrative embodiment of FIG. 2, the receive control module 260 may include the payment module 262. The payment module 262 may allow a user of the mobile device 240 to provide a form of payment for use of the transmit coil 110 to charge the batteries 254. In some embodiments, the payment module 262 may allow the user to access a payment website over the network 130 where a credit card may be entered as a form of payment. In other embodiments, the payment module 262 may access an online payment service such as PayPal over the network 262, where a form of payment may be entered. In still other embodiments, the payment module 262 may allow for the exchange of electronic funds or other goods or services that may be considered as a form of payment. Accordingly, a form of payment may be anything that may be exchanged by the user of the mobile device 140 and accepted by the owner of the location 105 to allow access to the transmit coil 110.

In one embodiment, the payment module 262 may be part of an application that automatically launches when the user of the device 140 enters the location 105 or that may be manually started at the location 105 or remotely from the location 105. The application may receive information from the payment module 222 of the transmit control module 120 about the cost of using the transmit coil 110 and the length of service. This information may then be provided to the user of the device 140, who may then use the application to enter a form of payment. The application may also store unused credits that allow the user of the mobile device 140 to purchase use of the transmit coil 110 and then use the transmit coil 110 to provide the electromagnetic signal 170 to the mobile device 140 at a future date.

The payment module 262 may provide payment verification information 236 to the payment module 222. The payment verification information 236 verifies that an acceptable form of payment has been made by the mobile device 140 and that the mobile device should receive the sequence of resonant drive frequencies 101 in response.

In one embodiment, the payment module 222 may include an advertisement module 222A. The advertisement module 222A may be operable to receive or generate various advertisements that may be of interest to the user of the mobile device 140. The advertisements may be provided to the payment module 262 over the network 130. The user of the mobile device 140 may then view the advertisement as a form of payment for the use of the transmit coil 110. The payment module may then provide the payment verification information 236 to the payment module 222. In this embodiment, the payment verification information 236 may indicate or verify that the mobile device 140 has played the advertisement so that the user may view the advertisement.

Upon receipt of the payment verification information 236 by the payment module 222, the frequency sequence generator 221 may provide the sequence of resonant drive frequencies 101 to the frequency sequence generator 261. In one embodiment, the sequence of resonant drive frequencies 101 may be a list of the actual resonant frequencies such as those discussed in relation to FIGS. 4 and 5. In addition, in some embodiments the sequence of resonant drive frequencies 101 may include the additional information about the frequencies such as the number of cycles and the length of time or phase of each of the frequencies so that the receive control module may know when to change the resonant frequency of the receive coil 150 so that the change occurs substantially at the same time that the resonant frequency of the transmit coil 110 moves.

Figure 7:
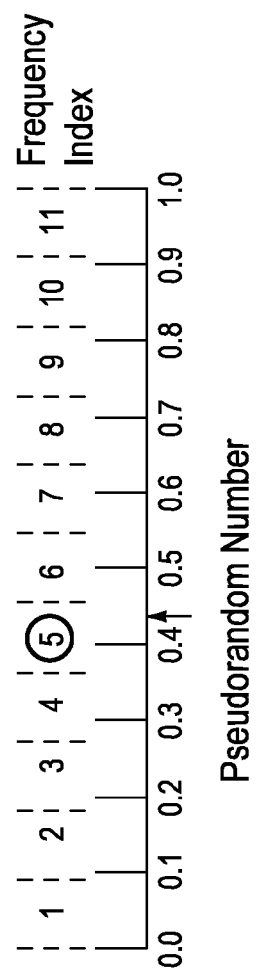
FIG. 7 illustrates an example of how a pseudorandom number between 0 is used to choose one of different resonant drive frequencies

In another embodiment, the frequency sequence generator 221 may include a counter and an encryption key 201 that are used to help generate the sequence of resonant drive frequencies 101. In one embodiment, a Cryptographic Secure Pseudorandom Number Generator (CSPRNG) algorithm may be used to implement the counter and encryption key 201, although other algorithms and systems may also be implemented. In the embodiment, the CSPRNG may be operated in "counter mode". In this mode, the frequency sequence generator 221 may send the frequency sequence generator 262 the counter and encryption key 201. The encryption key may be used to encrypt a counter value which may continuously increase as 0, 1, 2, and so on. Each encryption may create a pseudorandom number between 0 and 1 and this pseudorandom number may be used to choose the resonant drive frequency of the sequence of resonant drive frequencies 101. Since both the frequency sequence generator 221 and the frequency sequence generator 262 have the same counter and encryption key 201, the frequency values of the sequence of resonant drive frequencies 101 for both will change identically FIG. 7 illustrates an example of how a pseudorandom number between 0 and 1 is used to choose one of 11 different resonant drive frequencies. As illustrated, a frequency index includes the 11 different resonant drive frequencies. A pseudorandom number is generated that is a little more than 0.4 as indicated by the arrow in FIG. 7. The pseudorandom number falls within the frequency index 5. Accordingly, a resonant drive frequency corresponding to the frequency index 5 is selected as the resonant drive frequency. Since the frequency sequence generator 221 and frequency sequence generator 262 have the same counter and encryption key 201, they will both generate the same sequence of frequency indices. Advantageously, a mobile device 140 that does not receive the counter and encryption key 201 will not be able to follow the changing frequency indices because the pseudorandom generator is cryptographically strong.

In addition, the use of the counter and encryption key 210 may easily be adapted to selling packets of time for the mobile device 140 to use the transmit coil 110 for charging. For example, the encryption key may be changed at regular time intervals, such as a minute, with the counter reset to zero. Users of the mobile device 140 may buy a desired multiple of time intervals and receive as may encryption keys as the time intervals they have purchased.

Returning to FIG. 2, the receive control module 260 may cause the frequency generator 256 to drive the receive coil 150 with a resonant receive frequency that is substantially the same as the resonant drive frequency of the transmit coil 110 to ensure optimized or efficient electrical coupling between the two coils. In one embodiment, the transmit coil 110 and the receive coil 150 may be electromagnetically coupled by being driven by substantially similar resonant frequencies prior to the sequence of resonant drive frequencies 101 being received by the mobile device 140.

The receive control module 160 may then cause the frequency generator 256 to adjust or change the resonant receive frequency of the transmit coil 110 according to the first resonant drive frequency of the sequence of resonant drive frequencies 101. To ensure that the receive coil 150 remains at resonance, the receive control module 160 may adjust, or cause to be adjusted, the reactive element 253 to ensure that the receive coil 150 operates at a resonant receive frequency that is equivalent to the first resonant drive frequency of the sequence of resonant drive frequencies 101. More specifically, in one embodiment the control logic 263 may adjust, or cause to be adjusted, the reactive element 253.

For example, since the resonant receive frequency of the receive coil 150 is equal to $$\frac{1}{2\pi\sqrt{L_R C_R}}$$

as discussed previously, in one embodiment either the inductance or the capacitance of the receive coil 150, which are examples of the reactive element 253, may be adjusted to ensure that the receive coil 150 operates at the resonant receive frequency that is equivalent to the first resonant drive frequency of the sequence of resonant drive frequencies 101. The configuration of the receive coil 150 may determine which of the inductance or capacitance is adjusted. That is, some embodiments of receive coil 150 may include an adjustable inductance, some embodiments of receive coil 150 may include an adjustable capacitance, and some embodiments of receive coil 150 may include both an adjustable inductance and an adjustable capacitance.

In one embodiment, the reactive element 253 may be an adjustable inductance that may adjust in accordance with the change in the resonant receive frequency. The adjustable inductance may correspond to the adjustable inductor discussed previously in relation to FIG. 6. In another embodiment, the reactive element 253 may be an adjustable capacitance. The adjustable capacitance may include an adjustable capacitor, such as a varactor capacitor that is controlled by voltage. The adjustable capacitance may also be a MOSFET switching network or a MEMs variable capacitor array.

After the amount of time or the number of cycles specified for the first resonant drive frequency in the sequence of resonant drive frequencies 101 has occurred, the receive control module 160 may cause the frequency generator 256 to drive the receive coil 150 at a second resonant receive frequency that is equivalent to the second resonant drive frequency of the sequence of resonant drive frequencies 101. In addition, the receive control module 160 may adjust the reactive element 253 to ensure that the resonant receive frequency of the receive coil 150 matches the second resonant drive frequency. The receive control module 160 may continually adjust the resonant receive frequencies and the resonance of the receive coil 150 in accordance with the sequence of resonant drive frequencies 101.

Since the receive control module 160 and the transmit control module 120 adjust their respective associated reactive elements on a zero crossing of current or voltage, in one embodiment the receive control module 160 and the transmit control module 120 may both adjust the inductances or both adjust the capacitances of their respective associated reactive elements to ensure that the coils remain in phase.

In some embodiment, the mobile device 140 may need to wait to synchronize with the transmit coil 110 before the receive coil 150 can couple with the transmit coil, especially in those situations where the receive coil 150 attempts to couple during an ongoing transmission cycle of the transmit coil 110. In such embodiments, the receive control module 160 may study the received sequence of resonant drive frequencies 101 to determine the next time interval that a frequency change occurs. The receive control module 160 may then adjust the reactive element 253 so that the receive coil 150 is ready to couple at the correct resonant frequency at the time of the next frequency change. At that time the coupling may occur. In some embodiments, an extra magnetic spike in the electromagnetic signal 170 may be used to denote the start of a frequency change to help with the synchronization.

Accordingly, the transmit coil 110 and the receive coils 150 that have received the sequence of resonant drive frequencies 101 will operate at substantially the same resonant frequency and will also change resonant frequencies at substantially the same time. This will allow the receive coils 150 to maintain efficient electric coupling with the transmit coil 110 and thereby continue to have current induced by the electromagnetic signal 170 that may be used to charge the batteries 254. Since only the devices 140 that have provided an acceptable form of payment to the transmit control module 120 will receive the sequence of resonant drive frequencies 101, all other devices 140 will not be able to maintain efficient coupling with the transmit coil 110 and will not be able to be powered by the transmit coil 110.

Figure 8:
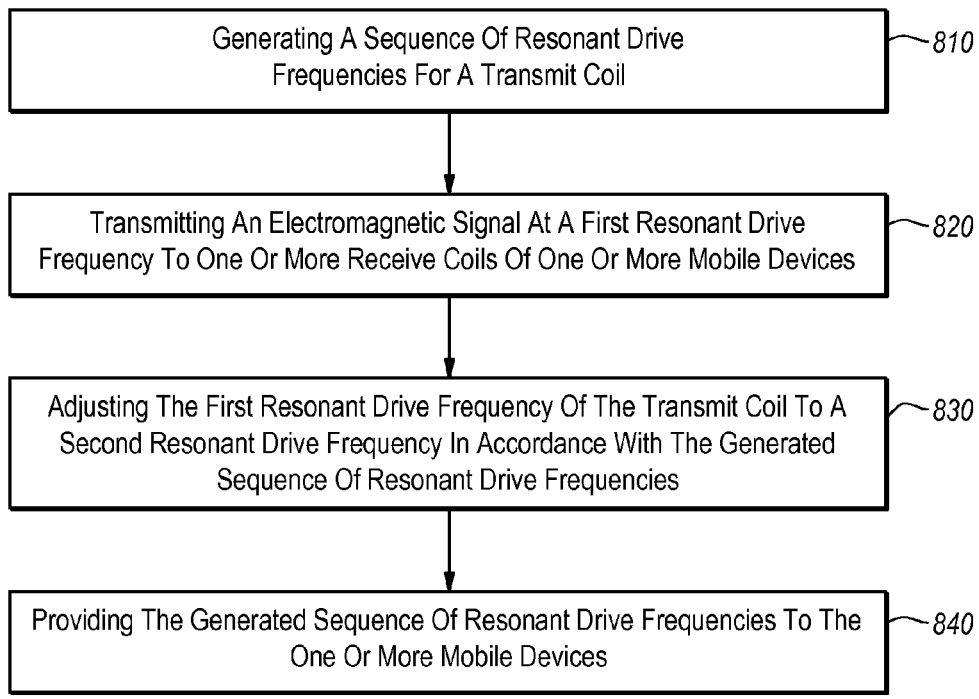
FIG. 8 is a flow diagram of an illustrative embodiment of a method to provide wireless power transfer to one or more mobile devices.

FIG. 8 is a flow diagram of an illustrative embodiment of a method 800 to provide wireless power transfer to one or more mobile devices. The method 800, and other methods and processes described herein, set forth various blocks or actions that may be described as processes, functional operations, events and/or acts, etc., which may be performed by hardware, software, firmware, and/or combination thereof.

The method 800 may include one or more operations as illustrated by blocks 810, 820, 830, and 840.

In block 810 ("Generating A Sequence of Resonant Drive Frequencies For A Transmit Coil"), a sequence of resonant drive frequencies for a transmit coil may be generated. For example, in one illustrative embodiment, the frequency sequence generator 221 of the transmit control module 120 may generate the sequence of resonant drive frequencies 101 in the manner previously described. The sequence of resonant drive frequencies 101 may be a random or otherwise unpredictable sequence of frequencies within the operating range of the transmit coil 110. The sequence of resonant drive frequencies 101 may also specify operational information about the set of frequencies such as how long each individual frequency will be implemented before a change occurs, the time of the change, or the number of cycles for each individual frequency.

In block 820 ("Transmitting An Electromagnetic Signal At A First Resonant Drive Frequency to One Or More Receive Coils OF One Or More Mobile Devices"), an electromagnetic signal at a first resonant drive frequency may be transmitted to one or more receive coils of one or more mobile devices. For example, in one illustrative embodiment, the electromagnetic signal 170 may be transmitted by the transmit coil 110 to the receive coil 150 of the mobile devices 140. The electromagnetic signal may be transmitted by transmit coil 110 at a first resonant drive frequency and received by the receive coil at a first resonant receive frequency that is equivalent to the first resonant drive frequency. This causes electrical coupling between the transmit coil 110 and the receive coil 150 in the manner previously described. The coupling allows the electromagnetic signal 170 to induce a current in the receive coil 150 to thereby provide power to the one or more mobile devices as previously described.

In block 830 ("Adjusting The First Resonant Drive Frequency Of The Transmit Coil To A Second Resonant Drive Frequency In Accordance With The Generated Sequence Of Resonant Drive Frequencies"), the first resonant drive frequency of the transmit coil may be adjusted to a second resonant drive frequency in accordance with the generated sequence of resonant drive frequencies. For example, in one illustrative embodiment, as previously described the transmit control module 120 may adjust, or caused to be adjusted, the first resonant drive frequency of the transmit coil 110 to the second resonant drive frequency in accordance with the sequence of resonant drive frequencies 101. In one embodiment, the transmit control module adjusts, or causes to be adjusted, the reactive element 215 associated with the transmit coil 110 to maintain resonance of the transmit coil. As previously described, the reactive element 215 may be an adjustable inductance or capacitance.

In block 840 ("Providing The Generated Sequence Of Resonant Drive Frequencies To The One Or More Mobile Devices"), the generated sequence of resonant drive frequencies may be provided to the one or more mobile devices. For example, in one illustrative embodiment, the transmit control module 120 may provide the sequence of resonant drive frequencies 101 to the receive control module 160 over the network 130. This allows a resonant receive frequency of the coil 150 of the mobile device 140 to adjust from a first resonant receive frequency to a second resonant receive frequency that is equivalent to the second resonant drive frequency at substantially the same time the transmit coil adjusts from the first to the second resonant drive frequencies in the manner previously described.

Figure 9:
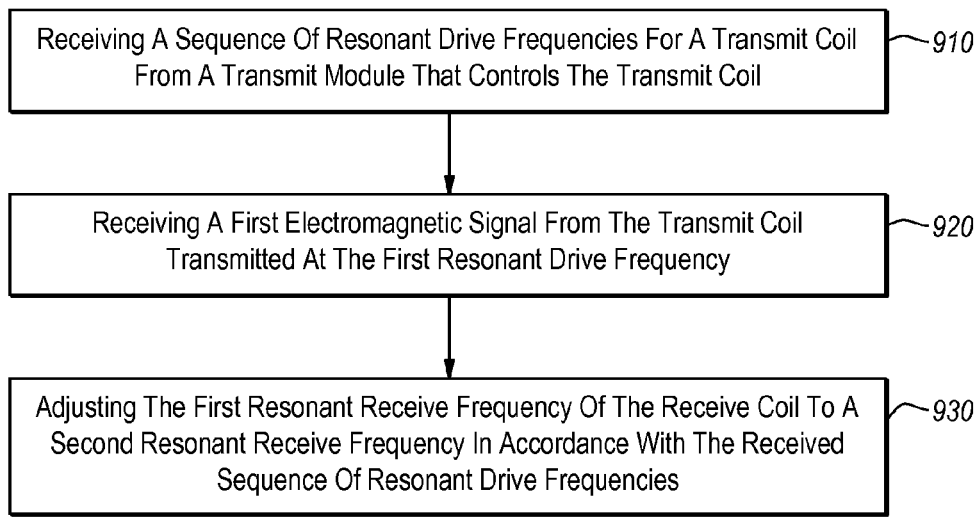
FIG. 9 is a flow diagram of an illustrative embodiment of a method for a mobile device to receive wireless power transfer.

FIG. 9 is a flow diagram of an illustrative embodiment of a method 900 for a mobile device to receive wireless power transfer. The method 900 may include one or more operations as illustrated by blocks 910, 920, and 930.

In block 910 ("Receiving A Sequence Of Resonant Drive Frequencies For A Transmit Coil From A Transmit Module That Controls The Transmit Coil"), a sequence of resonant drive frequencies for a transmit coil may be received from a transmit module that controls the transmit coil. For example, in one illustrative embodiment, the frequency sequence generator 261 of the receive control module 260 may receive the sequence of resonant drive frequencies 101 from the transmit control module 120. As previously discussed, the sequence of resonant drive frequencies 101 may be a random or otherwise unpredictable sequence of frequencies within the operating range of the transmit coil 110 and the receive coil 150. The sequence of resonant drive frequencies 101 may also specify operational information about the set of frequencies such as how long each individual frequency will be implemented before a change occurs, the time of the change, or the number of cycles for each individual frequency.

In block 920 ("Receiving A First Electromagnetic Signal From The Transmit Coil Transmitted At The First Resonant Drive Frequency"), a first electromagnetic signal from the transmit coil transmitted at the first resonant drive frequency may be received by the receive coil. For example, in one illustrative embodiment, the receive coil 150 may be operating at a first resonant receive frequency that is equivalent to a first resonant drive frequency of the transmit coil 110 to thereby couple with the transmit coil 150. The receive coil 150 may receive the electromagnetic signal 170 as that signal is transmitted by the transmit coil 110 at the first resonant drive frequency. As previously described, the electromagnetic signal 170 may induce a current in the receive coil 150 that is able to provide power to the mobile device 140.

In block 930 ("Adjusting The First Resonant Receive Frequency Of The Receive Coil To A Second Resonant Receive Frequency In Accordance With The Received Sequence Of Resonant Drive Frequencies"), the first resonant receive frequency of the receive coil may be adjusted to a second resonant receive frequency in accordance with the received sequence of resonant drive frequencies. For example, in one illustrative embodiment, as previously described the receive control module 160 may adjust, or caused to be adjusted, the first resonant receive frequency of the receive coil 150 to the second resonant receive frequency in accordance with the sequence of resonant drive frequencies 101. In one embodiment, the receive control module 160 adjusts, or causes to be adjusted, the reactive element 253 associated with the receive coil 150. As previously described, the reactive element 253 may be an adjustable inductance or capacitance.

Adjusting the first resonant receive frequency to the second resonant receive frequency allows the receive coil 150 to receive a second electromagnetic signal 170 from the transmit coil 110 transmitted at a second resonant drive frequency of the transmit coil 110. Since the second resonant receive frequency may be equivalent to the second resonant drive frequency, the receive coil is able to maintain coupling with the transmit coil 110 when the frequencies change.

For this and other processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

Figure 10:
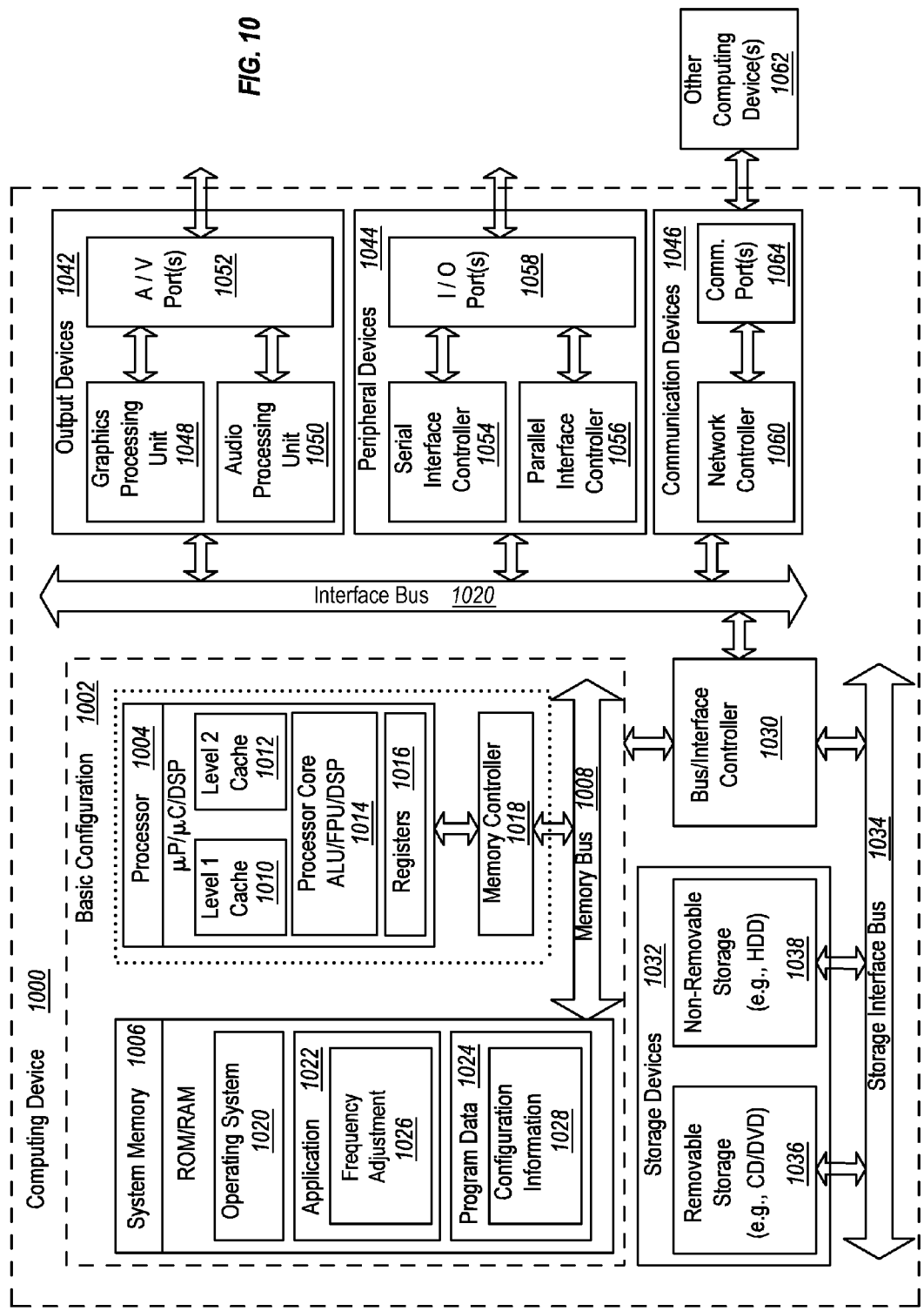
FIG. 10 shows an example computing device that is arranged for adjusting the resonant frequency of a transmit coil or receive coil in accordance with the present disclosure.

FIG. 10 shows an example computing device 1000 that is arranged for adjusting the resonant frequency of a transmit coil or receive coil and for receiving payment information in accordance with the present disclosure. In a very basic configuration 1002, computing device 1000 generally includes one or more processors 1004 and a system memory 1006. A memory bus 1008 may be used for communicating between processor 1004 and system memory 1006.

Depending on the desired configuration, processor 1004 may be of any type including but not limited to a microprocessor (µP), a microcontroller (µC), a digital signal processor (DSP), or any combination thereof. Processor 1004 may include one more levels of caching, such as a level one cache 1010 and a level two cache 1012, a processor core 1014, and registers 1016. An example processor core 1014 may include an arithmetic logic unit (ALU), a floating point unit (FPU), a digital signal processing core (DSP Core), or any combination thereof. An example memory controller 1018 may also be used with processor 1004, or in some implementations memory controller 1018 may be an internal part of processor 1004.

Depending on the desired configuration, system memory 1006 may be of any type including but not limited to volatile memory (such as RAM), non-volatile memory (such as ROM, flash memory, etc.) or any combination thereof. System memory 1006 may include an operating system 1020, one or more applications 1022, and program data 1024. Application 1022 may include frequency adjustment application 1026 that is arranged to perform at least some of the operations as described herein including at least some of those described with respect to methods 800-900 of FIGS. 8 and 9. Program data 1024 may include configuration information 1028 that may be useful to adjust a resonant frequency of a transmit or receive coil, and/or may include other information usable and/or generated by the various other modules/components described herein. The configuration information 1028 may include capacitance values, reactance values, inductance values, drive frequencies, coil areas, or the like. In some embodiments, application 1022 may be arranged to operate with program data 1024 on operating system 1020 such that optical components are formed and reconfigured as described herein. This described basic configuration 1002 is illustrated in FIG. 10 by those components within the inner dashed line.

Computing device 1000 may have additional features or functionality, and additional interfaces to facilitate communications between basic configuration 1002 and any required devices and interfaces. For example, a bus/interface controller 1030 may be used to facilitate communications between basic configuration 1002 and one or more data storage devices 1032 via a storage interface bus 1034. Data storage devices 1032 may be removable storage devices 1036, non-removable storage devices 1038, or a combination thereof. Examples of removable storage and non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and nonvolatile, removable and non-removable media implemented in any method or technology for storage of information, such as computer readable instructions, data structures, program modules, or other data System memory 1006, removable storage devices 1036 and non-removable storage devices 1038 are examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which may be used to store the desired information and which may be accessed by computing device 1000. Any such computer storage media may be part of computing device 1000.

Computing device 1000 may also include an interface bus 1040 for facilitating communication from various interface devices (e.g., output devices 1042, peripheral interfaces 1044, and communication devices 1046) to basic configuration 1002 via bus/interface controller 1030. Example output devices 1042 include a graphics processing unit 1048 and an audio processing unit 1050, which may be configured to communicate to various external devices such as a display or speakers via one or more A/V ports 1052. Example peripheral interfaces 1044 include a serial interface controller 1054 or a parallel interface controller 1056, which may be configured to communicate with external devices such as input devices (e.g., keyboard, mouse, pen, voice input device, touch input device, etc.) or other peripheral devices (e.g., printer, scanner, etc.) via one or more I/O ports 1058. An example communication device 1046 includes a network controller 1060, which may be arranged to facilitate communications with one or more other computing devices 1062 over a network communication link via one or more communication ports 1064.

The network communication link may be one example of a communication media. Communication media may generally be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 1000 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 1000 may also be implemented as a personal computer including both laptop computer and non-laptop computer configurations.

Example wireless power transfer systems may be deployed in a public location, such a retail environment (such as a restaurant, specialist purveyor of beverages, mall, and the like), transportation based environment (such as an airport, bus station, rail station, vehicle parking area, and the like), within a mass-transit vehicle environment (such as an airplane, boat, bus, train, and the like), and the like. However, deploying such systems may be expensive to the owner of a public location. The owner and/or operator associated with the environment may thus desire to selectively provide wireless power transfer only to users who pay the owner a fee, while blocking power transfer to users who do not pay the fee. Some embodiments allow the owner to recover the cost of installing a wireless power system, for example by charging a fee to a user, the user then receiving a sequence of resonant drive frequencies (including associated time data, if applicable), or other data allowing wireless power transfer to be received by a device associated with the user, or by displaying advertisements to the user.

In some embodiments, a system configured to provide wireless power transfer to a device comprises a transmit coil configured to generate an electromagnetic signal, a receive coil associated with the device, and a control module that is communicatively coupled to the transmit coil and to the device. The electromagnetic signal induces a current in the receive coil effective to provide power to the device. The control module may be configured to generate a sequence of drive frequencies, such as resonant drive frequencies, and to adjust a transmission frequency of the transmit coil in accordance with the generated sequence of drive frequencies and hence the frequencies of the electromagnetic radiation. The control module may further be configured to provide the sequence of resonant drive frequencies to the device. The device may then be configured to adjust the resonance of the receive coil of the device to match the transmission frequency, in both frequency and time, during a charging process. In some examples, the control module may be coupled to one or more mobile devices over a network, and may provide the sequence of resonant drive frequencies to the one or more mobile devices over the network.

In some example, the receive coil may be located in a charging device that is external to the mobile device that is to be charged. The external charging device, which may be considered as an example of a mobile device in the description and in the claims, may also include the control module or be communicatively coupled to the control module. The external charging device may receive the electromagnetic signal from the transmit coil and may also receive the sequence of drive frequencies in the manner previously described. The external charging device may then be configured to adjust the resonance of the receive coil of the device to match the transmission frequency, in both frequency and time, during a charging process. The external charging device may include a plug or other electrical connector for connecting to the mobile device to provide the charge to the mobile device. In this way, any type of mobile device may be charged by the embodiments disclosed herein without having to be configured to include the receive coil.

In some examples, the control module may be further configured to receive payment verification information from a mobile device, indicating that a form of payment has been received from the mobile devices. The form of payment may be a single payment, purchase of an item at the location (for example with an access code provided on a receipt), subscription, non-monetary (such as provision of personal information or membership in a club), and the like. Provision of the sequence of resonant drive frequencies to the mobile device may be conditioned on the payment verification information.

In some examples, a similar approach may be used for charging a charge used for higher power applications (e.g. compared to a mobile electronics device). For example, a similar approach may be used for charging a charge storage device of a vehicle, such as an electric vehicle or hybrid vehicle.

In some examples, the duration of the sequence may be used to determine a charging time. In some examples, a sequence may be purchased corresponding to a predetermined charging duration.

One embodiment disclosed herein provides a system to provide wireless power transfer to one or more mobile devices. The system includes a transmit coil that is configured to generate an electromagnetic signal that induces a current in one or more receive coils of the one or more mobile devices effective to provide power to the one or more mobile devices; and a control module that is communicatively coupled to the transmit coil and to the one or more mobile devices, the control module configured to generate a sequence of resonant drive frequencies and to adjust a resonant drive frequency of the transmit coil in accordance with the generated sequence of resonant drive frequencies. The control module is further configured to provide the sequence of resonant drive frequencies to the one or more mobile devices effective to allow the one or more receive coils of the one or more mobile devices to be driven by substantially the same resonant drive frequency as the transmit coil. The generated sequence of resonant drive frequencies is a random sequence.

The control module is coupled to the one or more mobile devices over a network and provides the sequence of resonant drive frequencies to the one or more mobile devices over the network. The control module is further configured to receive payment verification information that indicates that a form of payment has been received from at least one of the one or more mobile devices and wherein the control module provides the sequence of resonant drive frequencies to the at least one mobile device that provided the payment verification information. The control module is configured to provide an advertisement to the one or more mobile devices and to provide the sequence of resonant drive frequencies to a mobile device of the one or more mobile devices upon receipt of information that indicates that the mobile device has viewed the advertisement.

The transmit coil is located in a public location and is configured to induce current in the one or more mobile devices that are located in the public location. The transmit coil is configured to operate in a frequency range between 1 to 50 MHz. The transmit coil is configured to transmit between 0 W and 100 W of transmit power.

The system further includes a reactive element that is electrically coupled to the transmit coil and a frequency generator. The reactive element is configured to be adjusted by the control module in accordance with the sequence of resonant drive frequencies effective to change the resonant drive frequency at which the transmit coil transmits, and the frequency generator drives the transmit coil with the resonant drive frequency.

The control module includes a reactive element that is electrically coupled to the transmit coil, a frequency generator, and control logic that is configured to adjust the reactive element in accordance with the sequence of resonant drive frequencies effective to change the resonant drive frequency at which the transmit coil transmits. The control logic is further configured to adjust the frequency at which the frequency generator drives the transmit coil to be the resonant frequency.

In the system, the reactive element is one of an adjustable capacitance or an adjustable inductance. The reactive element includes a MOSFET switching network. The reactive element is adjusted by switching between a different number of turns of the reactive element. The reactive element is varactor capacitor that is controlled by a voltage.

In the system the control module adjusts the resonant drive frequency of the transmit coil at a zero crossing of current or at a zero crossing of voltage. The control module adjusts the resonant drive frequency of the transmit coil after a random number of cycles. The control module adjusts the resonant drive frequency of the transmit coil after a random amount of time.

In the system, the sequence of resonant drive frequencies is sent to the one or more mobile devices as a list of frequencies and times to change the frequencies. Alternatively, a counter and an encryption key are used to generate the sequence of resonant drive frequencies, the counter and encryption key being associated with a frequency index that specifies each of the resonant drive frequencies in the sequence that are to be used during a specific time period, and the counter and the encryption key are provided to the one or more mobile devices so that the one or more mobile devices can use the frequency index to determine which specific resonant drive frequency of the sequence to use at the specific time period.

One embodiment disclosed herein provides a method to provide wireless power transfer to one or more mobile devices. The method includes generating a sequence of resonant drive frequencies for a transmit coil, transmitting, by the transmit coil, an electromagnetic signal at a first resonant drive frequency to one or more receive coils of one or more mobile devices, the electromagnetic signal inducing a current in the one or more receive coils effective to provide power to the one or more mobile devices, the one or more receive coils operating at a first resonant receive frequency that is equivalent to the first resonant drive frequency, adjusting the first resonant drive frequency of the transmit coil to a second resonant drive frequency in accordance with the generated sequence of resonant drive frequencies, and providing the generated sequence of resonant drive frequencies to the one or more mobile devices effective to allow a resonant receive frequency of the one or more receive coils of the one or more mobile devices to adjust from the first resonant receive frequency to a second resonant receive frequency that is equivalent to the second resonant drive frequency at substantially the same time the transmit coil adjusts from the first to the second resonant drive frequencies. In the method, the generated sequence of resonant drive frequencies is a random sequence.

The method includes providing the generated sequence of resonant drive frequencies to the one or more mobile devices from a control module of the transmit coil over a network. The method includes receiving payment verification information that indicates that a form of payment has been received from at least one of the one or more mobile devices, and providing the generated sequence of resonant drive frequencies to the at least one mobile device that provided the payment verification information. The method includes providing an advertisement to the one or more mobile devices and providing the generated sequence of resonant drive frequencies to a mobile device of the one or more mobile devices upon receipt of information that indicates that the mobile device has viewed the advertisement.

In the method, adjusting the first resonant drive frequency of the transmit coil to a second resonant drive frequency in accordance with the generated sequence of resonant drive frequencies comprises one or more of adjusting a reactive element that is electrically coupled to the transmit coil, adjusting the frequency at which a frequency generator drives the transmit coil, adjusting the resonant drive frequency of the transmit coil at a zero crossing of current or at a zero crossing of voltage, adjusting the resonant drive frequency of the transmit coil after a random number of cycles, or adjusting the resonant drive frequency of the transmit coil after a random amount of time.

One embodiment disclosed herein provides a system for a mobile device to receive wireless power transfer. The system includes a receive coil that is configured to receive an electromagnetic signal from a transmit coil, the electromagnetic signal generated by the transmit coil being configured to induce a current in the receive coil, and a control module that is communicatively coupled to the receive coil and to a transmit module that controls the transmit coil, the control module configured to receive from the transmit module a sequence of resonant drive frequencies for the transmit coil. The control module is configured to adjust a resonant receive frequency of the receive coil in accordance with the sequence of resonant drive frequencies so that the resonant receive frequency of the receive coil matches the resonant drive frequency of the transmit coil. In the system, the sequence of resonant drive frequencies is a random sequence. The receive coil receives the electromagnetic signal from the transmit coil in a public location where the transmit coil has been installed.

The control module is coupled to the transmit module over a network and receives the sequence of resonant drive frequencies from the transmit module over the network. The control module is configured to provide payment verification information to the transmit module prior to receiving the sequence of resonant drive frequencies and wherein the sequence of resonant drive frequencies are received in response to providing the payment verification information. The control module is configured to receive an advertisement from the transmit module and to provide verification that the advertisement has been viewed, wherein the sequence of resonant drive frequencies is received in response to verifying the advertisement has been viewed.

The system further includes a reactive element that is electrically coupled to the receive coil and a frequency generator. The reactive element is configured to be adjusted by the control module in accordance with the sequence of resonant drive frequencies effective to change the resonant receive frequency at which the receive coil receives the electrometric signal. The frequency generator drives the receive coil with the resonant receive frequency. The system further includes a rectifier that is configured to deliver direct current to a rechargeable battery of the mobile device.

In the system, the control module includes a reactive element that is electrically coupled to the transmit coil, a frequency generator, and control logic that is configured to adjust the reactive element in accordance with the sequence of resonant drive frequencies effective to change the resonant receive frequency at which the receive coil transmits. The control logic is further configured to adjust the frequency at which the frequency generator drives the receive coil to be the resonant receive frequency.

In the system, the reactive element includes a MOSFET switching network. In the system, the reactive element is one of an adjustable capacitance or an adjustable inductance In the system the control module adjusts the resonant drive frequency of the receive coil at a zero crossing of current or at a zero crossing of voltage. The control module adjusts the resonant drive frequency of the receive coil after a random number of cycles. The control module adjusts the resonant drive frequency of the receive coil after a random amount of time.

In the system, the sequence of resonant drive frequencies is received by the control module from the transmit module as a list of frequencies and times to change the frequencies. Alternatively, a counter and an encryption key are used to generate the sequence of resonant drive frequencies, the counter and encryption key being associated with a frequency index that specifies each of the resonant drive frequencies in the sequence that are to be used during a specific time period, and the counter and the encryption key are received by the control module from the transmit module so that the control module can use the frequency index to determine which specific resonant drive frequency of the sequence to use at the specific time period.

One embodiment disclosed herein provides a method for a mobile device to receive wireless power transfer. The method includes receiving a sequence of resonant drive frequencies for a transmit coil from a transmit module that controls the transmit coil, receiving, at a receive coil of the mobile device that is operating at a first resonant receive frequency that is equivalent to a first resonant drive frequency of the transmit coil, a first electromagnetic signal from the transmit coil transmitted at the first resonant drive frequency, the electromagnetic signal inducing a current in the receive coil effective to provide power to the mobile device, and adjusting the first resonant receive frequency of the receive coil to a second resonant receive frequency in accordance with the received sequence of resonant drive frequencies so that the receive coil is able to receive a second electromagnetic signal from the transmit coil transmitted at a second resonant drive frequency, the second resonant receive frequency being equivalent to the second resonant drive frequency. In the method, the received sequence of resonant drive frequencies is a random sequence.

The method includes receiving the sequence of resonant drive frequencies from the transmit module over a network. The method includes providing payment verification information to the transmit module and receiving the sequence of resonant drive frequencies in response to providing the payment verification information. The method includes receiving an advertisement from the transmit module, providing verification to the transmit module that the advertisement has been viewed, and receiving the sequence of resonant drive frequencies in response to verifying the advertisement has been viewed.

In the method adjusting the first resonant receive frequency of the receive coil to a second resonant receive frequency in accordance with the received sequence of resonant drive frequencies includes one or more of adjusting a reactive element that is electrically coupled to the receive coil, adjusting the frequency at which a frequency generator drives the receive coil, adjusting the resonant receive frequency of the receive coil at a zero crossing of current or at a zero crossing of voltage, adjusting the resonant receive frequency of the receive coil after a random number of cycles, or adjusting the resonant receive frequency of the receive coil after a random amount of time.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled. This disclosure is not limited to particular methods, reagents, compounds compositions or biological systems, which can, of course, vary. The terminology used herein is for the purpose of describing particular embodiments only, and is not intended to be limiting.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

The use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware are possible in light of this disclosure. In addition, the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those generally found in data computing/communication and/or network computing/communication systems.

The herein described subject matter sometimes illustrates different components contained within, or connected with, different other components. Such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, various embodiments of the present disclosure have been described herein for purposes of illustration, and various modifications may be made without departing from the scope and spirit of the present disclosure. Accordingly, the various embodiments disclosed herein are not intended to be limiting, with the true scope and spirit being indicated by the following claims.

What is claimed is:

1. A system to provide wireless power transfer to one or more mobile devices, the system comprising:
   a transmit coil that is configured to generate an electromagnetic signal that induces a current in one or more receive coils of the one or more mobile devices to provide power to the one or more mobile devices; and
   a control module that is communicatively coupled to the transmit coil and to the one or more mobile devices, wherein the control module is configured to:
      generate a sequence of resonant drive frequencies, wherein the generated sequence of resonant drive frequencies includes a number of frequencies that vary in a number of cycles,
      generate a pseudorandom number that falls within a particular frequency index,
      select a resonant drive frequency, from among the generated sequence of resonant drive frequencies, of the transmit coil that corresponds to the particular frequency index, and
      provide the generated sequence of resonant drive frequencies to the one or more mobile devices to allow the one or more receive coils of the one or more mobile devices to be driven by substantially same resonant drive frequency as the selected resonant drive frequency of the transmit coil.

2. The system of claim 1, wherein the control module is communicatively coupled to the one or more mobile devices over a network and is configured to provide the generated sequence of resonant drive frequencies to the one or more mobile devices over the network.

3. The system of claim 1, wherein the control module is further configured to receive payment verification information that indicates that a form of payment has been received from at least one of the one or more mobile devices, and wherein the control module provides the generated sequence of resonant drive frequencies to the at least one of the one or more mobile devices that provided the payment verification information.

4. The system of claim 1, wherein the transmit coil is located in a public location and is configured to induce the current in the one or more mobile devices that are located in the public location.

5. The system of claim 1, wherein the transmit coil is configured to operate in a frequency range between 1 to 50 MHz and is configured to transmit between 0 W and 100 W of transmit power.

6. The system of claim 1, further comprising:
   a reactive element that is electrically coupled to the transmit coil; and
   a frequency generator,
   wherein the reactive element is configured to be adjusted by the control module in accordance with the generated sequence of resonant drive frequencies to change the selected resonant drive frequency at which the transmit coil transmits, and
   wherein the frequency generator drives the transmit coil with the selected resonant drive frequency.

7. The system of claim 6, wherein the reactive element is one of an adjustable inductance or capacitance.

8. The system of claim 1, wherein the control module is configured to adjust the selected resonant drive frequency of the transmit coil at one or more of a zero crossing of current or at a zero crossing of voltage, after a random number of cycles, or after a random amount of time.

9. The system of claim 1, wherein a counter and an encryption key are used to generate the sequence of resonant drive frequencies, wherein the counter and the encryption key are associated with the particular frequency index that specifies each of the resonant drive frequencies in the generated sequence that are to be used during a specific time period, and
   wherein the counter and the encryption key are provided to the one or more mobile devices so that the one or more mobile devices use the particular frequency index to determine which specific resonant drive frequency of the generated sequence to use at the specific time period.

10. A method to provide wireless power transfer to one or more mobile devices, the method comprising:
generating a sequence of resonant drive frequencies for a transmit coil, wherein the generated sequence of resonant drive frequencies includes a number of frequencies that vary in a number of cycles;
generating a first pseudorandom number that falls within a first frequency index;
selecting a first resonant drive frequency, from among the generated sequence of resonant drive frequencies, of the transmit coil that corresponds to the first frequency index;
transmitting, by the transmit coil, an electromagnetic signal at the first resonant drive frequency to one or more receive coils of the one or more mobile devices, the electromagnetic signal inducing a current in the one or more receive coils to provide power to the one or more mobile devices, the one or more receive coils operating at a first resonant receive frequency that is equivalent to the first resonant drive frequency;
generating a second pseudorandom number that falls within a second frequency index;
selecting a second resonant drive frequency, from among the generated sequence of resonant drive frequencies, of the transmit coil that corresponds to the second frequency index;
adjusting the first resonant drive frequency of the transmit coil to the second resonant drive frequency in accordance with the generated sequence of resonant drive frequencies; and
providing the generated sequence of resonant drive frequencies to the one or more mobile devices to allow a resonant receive frequency of the one or more receive coils of the one or more mobile devices to adjust from the first resonant receive frequency to a second resonant receive frequency that is equivalent to the second resonant drive frequency at substantially same time the transmit coil adjusts from the first resonant drive frequency to the second resonant drive frequency.

11. The method of claim 10, wherein adjusting the first resonant drive frequency of the transmit coil to the second resonant drive frequency in accordance with the generated sequence of resonant drive frequencies comprises one or more of:
adjusting a reactive element that is electrically coupled to the transmit coil, adjusting a frequency at which a frequency generator drives the transmit coil, adjusting a resonant drive frequency of the transmit coil at a zero crossing of current or at a zero crossing of voltage, adjusting the resonant drive frequency of the transmit coil after a random number of cycles, or adjusting the resonant drive frequency of the transmit coil after a random amount of time.

12. A system for a mobile device to receive wireless power transfer, the system comprising:
a receive coil that is configured to receive an electromagnetic signal from a transmit coil, wherein the electromagnetic signal, generated by the transmit coil, is configured to induce a current in the receive coil; and
a control module that is communicatively coupled to the receive coil and to a transmit module that controls the transmit coil, wherein the control module is configured to:
receive, from the transmit module, a sequence of resonant drive frequencies for the transmit coil, wherein the received sequence of resonant drive frequencies includes a number of frequencies that vary in a number of cycles, wherein a selected resonant drive frequency, from among the sequence of resonant drive frequencies, is received from the transmit module, and wherein the selected resonant drive frequency is generated, by the transmit module, based on a pseudorandom number that falls within a particular frequency index, and
adjust a resonant receive frequency of the receive coil in accordance with the received sequence of resonant drive frequencies so that the resonant receive frequency of the receive coil matches the selected resonant drive frequency of the transmit coil.

13. The system of claim 12, wherein the control module is coupled to the transmit module over a network and is configured to receive the sequence of resonant drive frequencies from the transmit module over the network.

14. The system of claim 12, wherein the control module is further configured to provide payment verification information to the transmit module prior to the receipt of the sequence of resonant drive frequencies, and wherein the sequence of resonant drive frequencies is received in response to provision of the payment verification information.

15. The system of claim 12, wherein the receive coil is configured to receive the electromagnetic signal from the transmit coil in a public location where the transmit coil has been installed.

16. The system of claim 12, further comprising:
a reactive element that is electrically coupled to the receive coil; and
a frequency generator,
wherein the reactive element is configured to be adjusted by the control module in accordance with the received sequence of resonant drive frequencies to change the resonant receive frequency at which the receive coil receives the electromagnetic signal, and
wherein the frequency generator drives the receive coil with the resonant receive frequency.

17. The system of claim 16, wherein the reactive element is one of an adjustable inductance or capacitance.

18. The system of claim 12, wherein the control module is configured to adjust the resonant receive frequency of the receive coil after: a random number of cycles or a random amount of time.

19. The system of claim 12, wherein a counter and an encryption key are used to generate the sequence of resonant drive frequencies, wherein the counter and the encryption key are associated with the particular frequency index that specifies each of the resonant drive frequencies in the generated sequence that are to be used during a specific time period, and
wherein the counter and the encryption key are received by the control module from the transmit module so that the control module uses the particular frequency index to determine which specific resonant drive frequency of the generated sequence to use at the specific time period.

20. A method for a mobile device to receive wireless power transfer, the method comprising:
receiving a sequence of resonant drive frequencies for a transmit coil from a transmit module that controls the transmit coil, wherein the received sequence of resonant drive frequencies includes a number of frequencies that vary in a number of cycles;

receiving, at a receive coil of the mobile device that is operating at a first resonant receive frequency that is equivalent to a first resonant drive frequency of the transmit coil, a first electromagnetic signal from the transmit coil transmitted at the first resonant drive frequency, wherein the first resonant drive frequency is selected, from among the received sequence of resonant drive frequencies, by the transmit module, wherein the first resonant drive frequency is generated by the transmit module based on a first pseudorandom number that falls within a first frequency index, and wherein the electromagnetic signal induces a current in the receive coil to provide power to the mobile device; and adjusting the first resonant receive frequency of the receive coil to a second resonant receive frequency in accordance with the received sequence of resonant drive frequencies so that the receive coil is able to receive a second electromagnetic signal from the transmit coil transmitted at a second resonant drive frequency, the second resonant receive frequency being equivalent to the second resonant drive frequency, wherein the second resonant drive frequency is selected, from among the sequence of resonant drive frequencies, by the transmit module, and wherein the second resonant drive frequency is generated by the transmit module based on a second pseudorandom number that falls within a second frequency index.

21. The method of claim 20, wherein adjusting the first resonant drive frequency of the receive coil to the second resonant receive frequency in accordance with the received sequence of resonant drive frequencies comprises one or more of: adjusting a reactive element that is electrically coupled to the receive coil, adjusting a frequency at which a frequency generator drives the receive coil, adjusting a resonant receive frequency of the receive coil at a zero crossing of current or at a zero crossing of voltage, adjusting the resonant receive frequency of the receive coil after a random number of cycles, or adjusting the resonant receive frequency of the receive coil after a random amount of time.

\* \* \* \* \*